United States Patent
Reznik et al.

(10) Patent No.: US 8,192,027 B2
(45) Date of Patent: *Jun. 5, 2012

(54) CALIBRATION AND TRACKING CONTROL OF HELIOSTATS IN A CENTRAL TOWER RECEIVER SOLAR POWER PLANT

(75) Inventors: Dan S. Reznik, New York, NY (US); Adam D. Azarchs, Pasadena, CA (US); Ambrus Csaszar, Pasadena, CA (US); Matthew B. Hartshorn, Pasadena, CA (US)

(73) Assignee: Esolar, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/333,828

(22) Filed: Dec. 21, 2011

(65) Prior Publication Data

US 2012/0092491 A1    Apr. 19, 2012

Related U.S. Application Data

(63) Continuation of application No. 12/257,368, filed on Oct. 23, 2008, now Pat. No. 8,104,893.

(60) Provisional application No. 61/000,358, filed on Oct. 24, 2007.

(51) Int. Cl.
*F24J 2/38* (2006.01)
*G02B 7/183* (2006.01)
*G05D 3/00* (2006.01)

(52) U.S. Cl. .......... 353/3; 126/573; 126/906; 250/203.4

(58) Field of Classification Search ...... 353/3; 136/246; 126/573, 574, 576, 600, 601, 603, 906; 356/216, 356/445; 250/203.4, 559.07, 559.08
See application file for complete search history.

(56) References Cited

U.S. PATENT DOCUMENTS

| | | | |
|---|---|---|---|
| 4,117,682 | A | 10/1978 | Smith |
| 4,141,626 | A | 2/1979 | Treytl et al. |
| 4,215,410 | A | 7/1980 | Weslow et al. |

(Continued)

FOREIGN PATENT DOCUMENTS

DE    3325919 A1    1/1985

(Continued)

OTHER PUBLICATIONS

International Search Report dated Dec. 11, 2008 and mailed Dec. 24, 2008, Corresponding to PCT/US2008/081036 (3 sheets).

(Continued)

*Primary Examiner* — John Lee
(74) *Attorney, Agent, or Firm* — Christie, Parker & Hale, LLP

(57) ABSTRACT

A suntracking system for a central receiver solar power plant includes a heliostat field for reflecting sunlight to a receiver, cameras directed toward at least a subset of the heliostats, and a controller. The cameras are configured to produce images of sunlight reflected from multiple heliostats. The heliostats include a mirrored surface having a settable orientation and have a geometry modeled by a set of parameters. A method of estimating heliostat parameters for open-loop suntracking includes acquiring pointing samples by setting the direction of reflection of the heliostats and detecting concurrent sunlight reflections into the cameras. The method uses the acquired pointing samples and surveyed locations of the cameras to estimate the heliostat parameters. The method accurately maintains the sun's reflection directed toward the receiver open-loop utilizing the estimated tracking parameters.

17 Claims, 13 Drawing Sheets

U.S. PATENT DOCUMENTS

| | | | |
|---|---|---|---|
| 4,440,150 | A | 4/1984 | Kaehler |
| 4,466,423 | A | 8/1984 | Dolan et al. |
| 4,536,847 | A | 8/1985 | Erickson et al. |
| 4,564,275 | A | 1/1986 | Stone |
| 4,757,337 | A | 7/1988 | Shikaumi |
| 5,578,140 | A | 11/1996 | Yogev et al. |
| 5,861,947 | A | 1/1999 | Neumann |
| 5,862,799 | A | 1/1999 | Yogev et al. |
| 6,704,607 | B2 | 3/2004 | Stone et al. |
| 6,899,096 | B2 | 5/2005 | Nakamura |
| 6,984,050 | B2 | 1/2006 | Nakamura |
| 7,115,851 | B2 | 10/2006 | Zhang |
| 7,906,750 | B2 | 3/2011 | Hickerson et al. |
| 8,104,893 | B2 * | 1/2012 | Reznik et al. ............ 353/3 |
| 2004/0086021 | A1 | 5/2004 | Litwin |
| 2004/0231716 | A1 | 11/2004 | Litwin |
| 2005/0274376 | A1 | 12/2005 | Litwin et al. |
| 2005/0279953 | A1 | 12/2005 | Gerst |
| 2009/0038608 | A1 | 2/2009 | Caldwell |
| 2009/0107485 | A1 | 4/2009 | Reznik et al. |
| 2010/0031952 | A1 | 2/2010 | Zavodny et al. |
| 2011/0000478 | A1 | 1/2011 | Reznik |

FOREIGN PATENT DOCUMENTS

| | | |
|---|---|---|
| GB | 2 329 976 A | 4/1999 |
| WO | WO 2004/013598 A1 | 2/2004 |
| WO | WO 2009/055624 A1 | 4/2009 |

OTHER PUBLICATIONS

Written Opinion dated Dec. 11, 2008 and mailed Dec. 24, 2008, Corresponding to PCT/US2008/081036 (11 sheets).

Office action issued in China Patent Application No. 200880122596.5, Office Action issued on Oct. 26, 2011 (4 sheets).

English language translation of Office Action issued in China Patent Application No. 200880122596.5 on Oct. 26, 2011 (5 sheets).

* cited by examiner

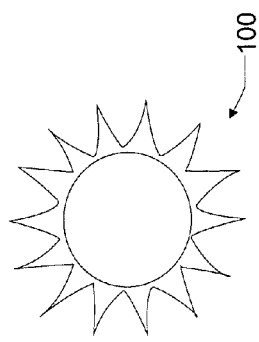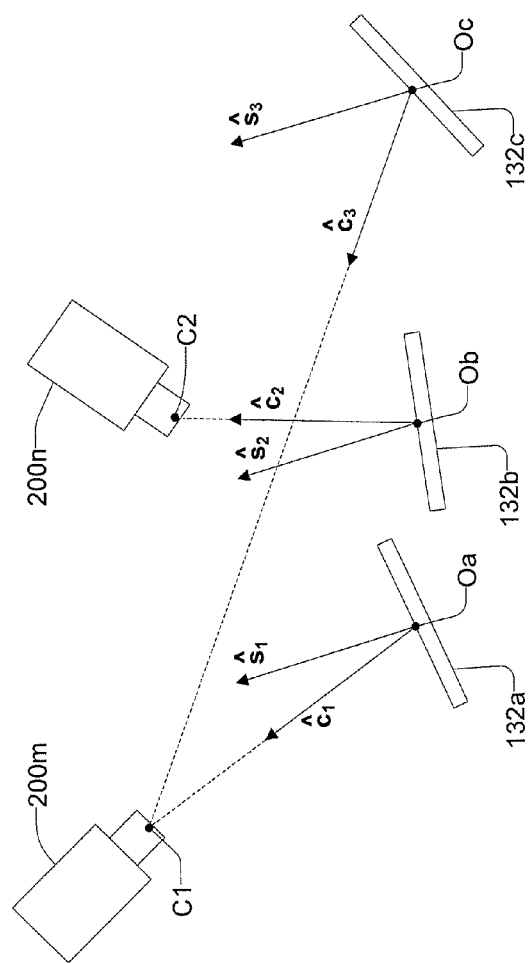
Fig. 6

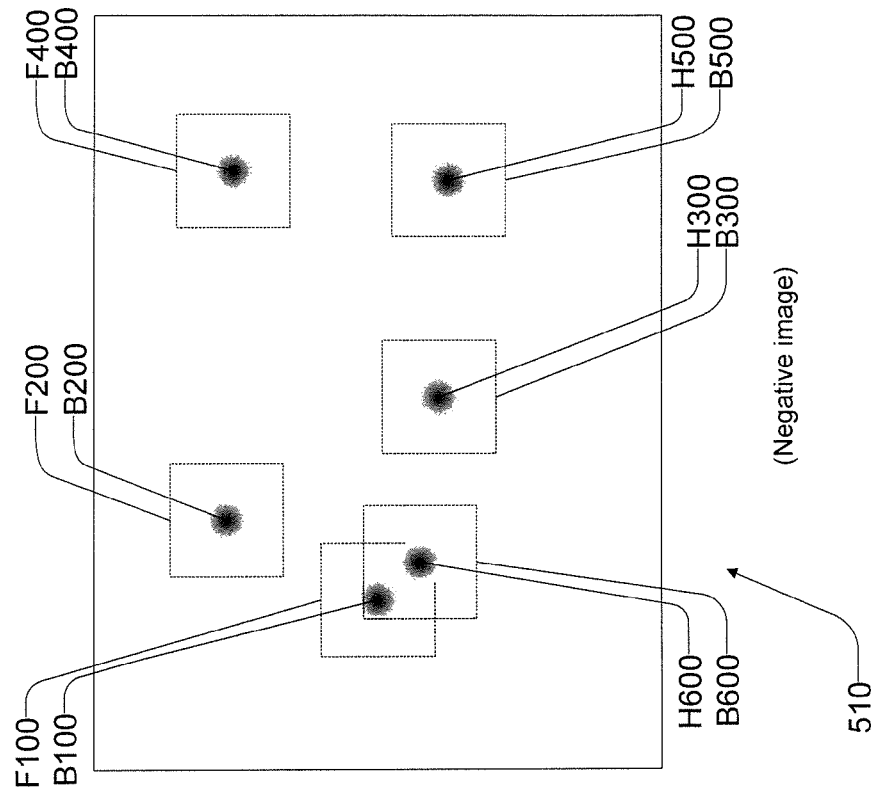
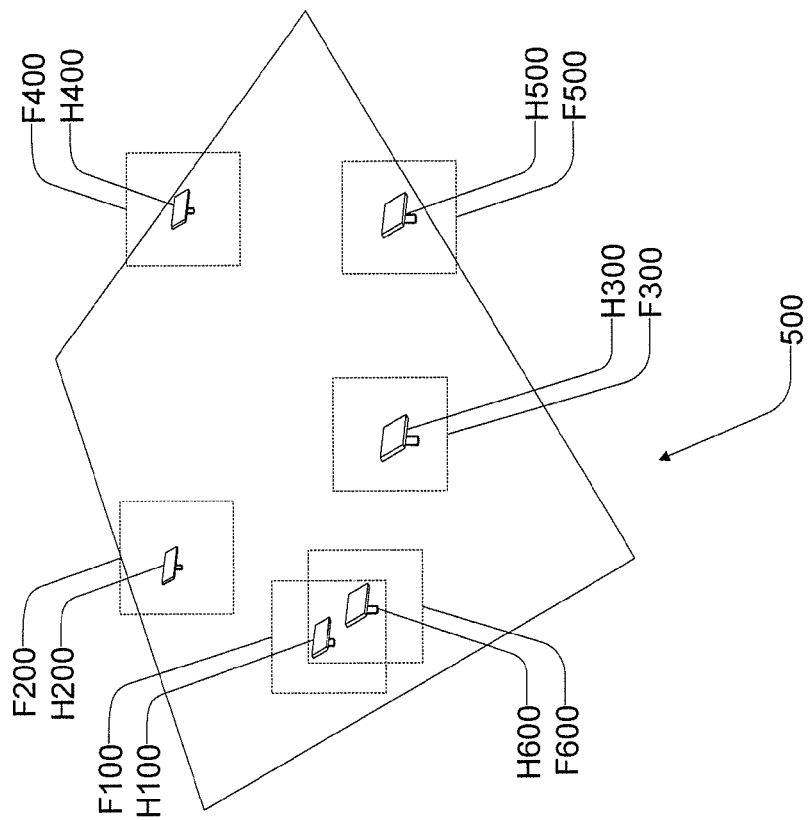

CALIBRATION AND TRACKING CONTROL
OF HELIOSTATS IN A CENTRAL TOWER
RECEIVER SOLAR POWER PLANT

CROSS-REFERENCE TO RELATED APPLICATION

This application is a continuation of U.S. patent application Ser. No. 12/257,368, filed on Oct. 23, 2008, now U.S. Pat. No. 8,104,893, which claims the benefit of U.S. Provisional Application No. 61/000,358, filed on Oct. 24, 2007, the entire contents of which are incorporated herein by reference.

BACKGROUND OF THE INVENTION

The present invention relates generally to a solar power plant, and more particularly to heliostat tracking calibration in a central tower receiver solar power plant.

In a central tower receiver power plant, an array of heliostats reflects sunlight toward a receiver mounted atop a tower. One type of receiver converts incident radiant energy into output high-pressure, high-temperature steam, which can later be fed to a turbine for electrical power generation. Heliostats are generally mounted on the ground in an area about the tower. Each heliostat has a rigid reflective surface capable of suntracking, that is, the surface takes on orientations throughout the day so as to maintain reflection of the moving sun onto the receiver. Highly accurate suntracking is desirable as it minimizes spillage of reflected light around the receiver and allows some control of the flux pattern incident on the receiver surfaces.

In a large power plant, there may be hundreds to hundreds of thousands of heliostats. Besides suntracking accuracy, it is additionally desirable that the heliostats be economically manufactured and installed. In turn, this may be associated with mechanical tolerances and other limitations that adversely affect suntracking accuracy. Accordingly, it is desirable to create a system that properly estimates the tolerances, to execute suntracking in a calibrated manner, achieving little or no spillage losses.

SUMMARY OF THE INVENTION

Aspects of embodiments of the present invention are directed toward heliostat tolerance calibration for suntracking in a central tower receiver solar plant.

An embodiment of the present invention provides a suntracking system for a central receiver solar power plant, including: a heliostat field including heliostats for reflecting sunlight to a receiver; cameras directed toward at least a subset of the heliostats and configured for producing images of the heliostats; and a controller configured for processing the images, controlling the heliostats, and estimating parameters of the heliostats for tracking the sun open-loop.

Another embodiment of the present invention provides a method for estimating heliostat parameters for open-loop suntracking in a central receiver solar power plant, the plant including a plurality of heliostats for reflecting sunlight to a receiver and a plurality of cameras, each heliostat's geometry modeled by a set of parameters, each heliostat including a mirrored surface having an orientation settable by a configuration, each camera directed toward at least a subset of the heliostats and configured for producing images of the heliostats, the method including: acquiring heliostat pointing samples utilizing the cameras directed at the heliostats; estimating heliostat tracking parameters utilizing the pointing samples; and maintaining the sun's reflection directed toward the receiver open-loop utilizing the estimated tracking parameters.

BRIEF DESCRIPTION OF THE DRAWINGS

These and other features and aspects according to exemplary embodiments of the present invention will become better understood in reference to the following description, appended claims, and accompanying drawings where:

FIG. 6 is a further diagram of sunlight reflections according to aspects of the present invention;

FIG. 7A is a schematic diagram of a portion of a heliostat field as projected onto a camera plane according to aspects of the present invention;

FIG. 7B is an image produced by a camera of a set of heliostats reflecting the sun at the camera according to aspects of the present invention;

DETAILED DESCRIPTION

A central tower receiver power plant, in an embodiment of the present invention, includes a tower-mounted receiver that receives sunlight for direct steam or electricity production. The receiver will typically accept sunlight over a range of angles and within an aperture. Sunlight is reflected toward the receiver aperture by a large number of ground-mounted heliostats that adjust their mirror orientations to track the moving sun. While tracking, the direction in which a heliostat reflects sunlight is dynamically adjusted (as commanded by a controller) as the sun moves to substantially continuously reflect sunlight into the receiver aperture. The power plant also includes several tower-mounted cameras pointed toward the heliostats. Following a surveying process, the locations of the receiver and the cameras are obtained with respect to a global coordinate frame. However, geometric information about the heliostats cannot be cost-effectively gathered from the surveying process in a power plant where ten to hundreds of thousands of heliostats are present. Following typical manufacturing and installation processes, heliostat geometric information is known only up to a tolerance, or "nominally." Generally, the tolerance far exceeds a level required for accurate tracking. Thus, the system estimates parameters of the heliostat's geometry. To estimate the parameters in a highly automated and parallel way, the system commands the heliostats to reflect sunlight to the cameras during a pointing sample acquisition process, after which the heliostat parameters can be estimated with narrow enough tolerances to enable accurate open-loop suntracking.

The process of estimating the heliostat parameters includes concurrently pointing subsets of the heliostats to reflect sunlight to the cameras. Pointing samples are acquired following a search process for the centroid of a region of heliostat configurations that reflect sunlight to a camera under a certain sun position. The region exists due to both sun spread and finite size of the mirror. Each pointing sample is a record of both heliostat and camera identifiers, the sun position, and the centroid configuration. After a sufficient number of pointing samples are acquired for each heliostat, the process estimates a set of parameters for the heliostats using the acquired pointing samples. The estimated parameters are sufficient for accurate suntracking and are used accordingly to achieve high-concentration, low-spillage, and controllable fluxes within the receiver aperture. After an initial parameter estimation phase, a subset of the heliostats continue to search for pointing samples (so as to refresh their parameters) while the other heliostats track the sun for power generation. This allows the system to account for minute shifts in the installation geometry, ground characteristics, and other time-dependent variations in the estimated parameters.

Figure 1:
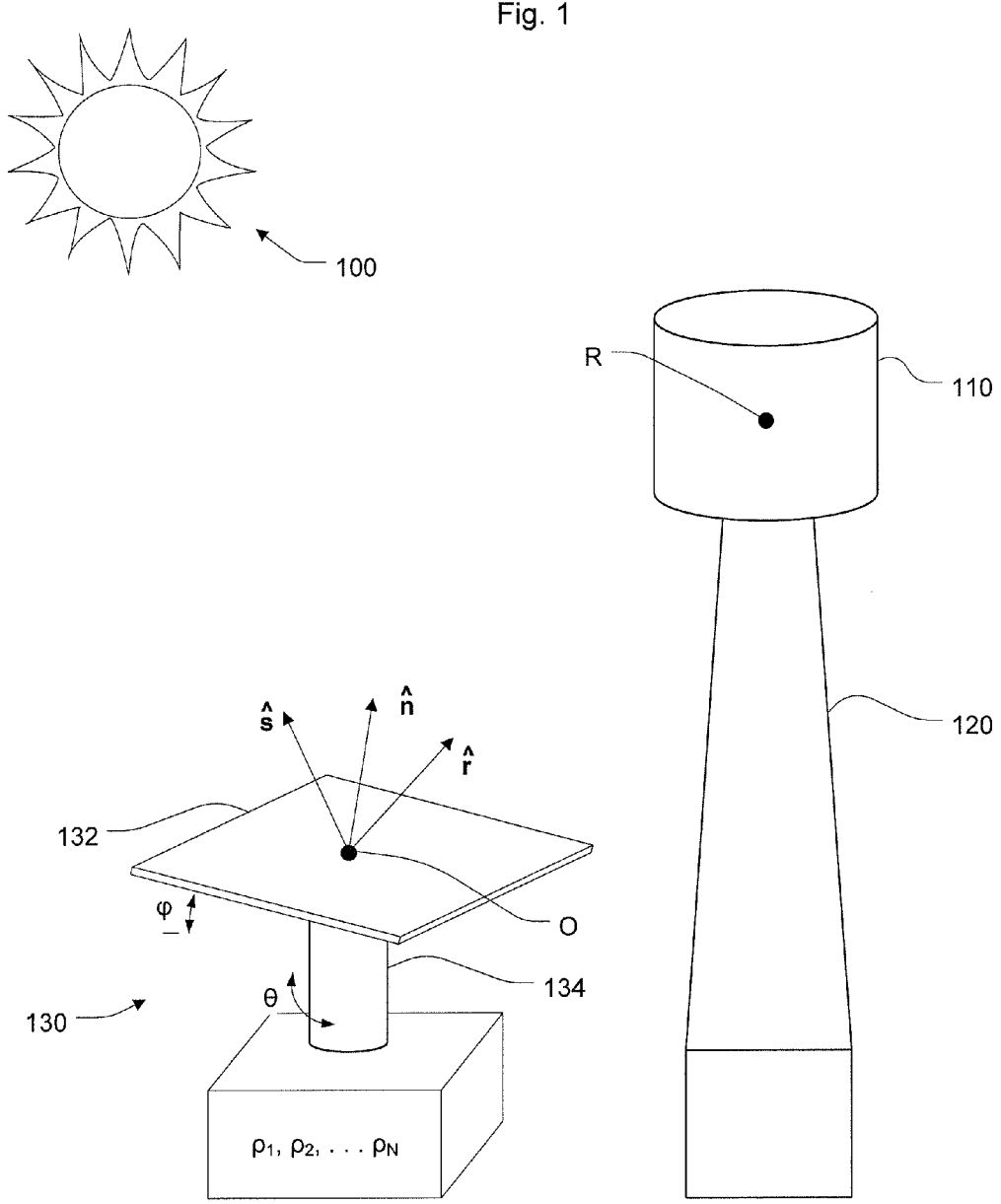
FIG. 1 is a schematic view of a heliostat reflecting sunlight to a receiver according to aspects of the present invention.

FIG. 1 shows aspects of how a heliostat 130 is modeled according to the present invention. The heliostat 130 has a mirrored surface 132 that reflects light from the sun 100 to a receiver 110. The receiver 110 is generally mounted atop a tower 120. Sunlight incident on the receiver 110 is captured by the receiver 110 and transferred as heat to a heat transfer fluid, such as hot oil, steam, or molten salt, or converted directly to electricity by high-concentration photovoltaic cells. The heat transfer fluid may be used directly in some embodiments or later used in connection with a power block containing a turbine to generate electricity.

The mirrored surface 132 or mirror of the heliostat 130 is a rigid and substantially planar surface in the embodiment of FIG. 1. In other embodiments, other shapes may be used, for example, a concave or multi-faceted surface. Reflection of sunlight to the receiver 110 depends on the orientation of the mirrored surface 132. The geometry of reflected sunlight is shown by unit vectors $\hat{s}$, $\hat{n}$, and $\hat{r}$. Vectors $\hat{s}$ represents the direction from a center point O of the mirrored surface 132 of the heliostat 134 to the sun. Vector $\hat{n}$ represents the direction normal to the mirrored surface 132. When the mirror is not planar, $\hat{n}$ may represent the normal at the center vertex of a concave or multi-faceted surface. Vector $\hat{r}$ represents the direction from the center point O of the mirrored surface 132 to a target point R on the receiver 110. When $\hat{n}$ bisects the angle between $\hat{s}$ and $\hat{r}$, sunlight will be reflected to the receiver, and the mirror is said to be on-sun. A mirror that remains on-sun while the sun is moving is said to be suntracking.

The mirrored surface 132 of the heliostat 130 is mounted on a pedestal 134 in the embodiment of FIG. 1. In other embodiments, the heliostat may be mounted on a frame or other rigid support structure, ground or non-ground penetrating. In the shown embodiment, the kinematics of the heliostat, which controls the orientation of its mirrored surface, is parameterized by two rotations. The first rotation $\theta$ is about an axis that is substantially perpendicular to the earth's surface. The second rotation $\phi$ is about an axis that is substantially tangential to the earth's surface. The first rotation $\theta$ may be termed a pan motion. The second rotation $\phi$ may be termed a tilt angle. In another embodiment, known as "tilt-tilt," the two rotations are about two mutually perpendicular, substantially horizontal axes, which may offer singularity-free suntracking in some circumstances. The present invention is not restricted to any particular heliostat kinematic, as long as the kinematic is known, and it enables the mirror normal to span the solid angle required for suntracking. In some embodiments, the mirror may be driven by stepper motors, which, via step counting, conveniently eliminate the need for position encoders and associated electronics, however they may require a home position sensor such as a limit switch and a mechanical stop.

Forward kinematics maps the two-angle heliostat configuration to the mirror normal. For the idealized heliostat of FIG. 1, the two axes of rotation are axis-aligned, perpendicular, and intersect at the center O of the mirrored surface. Thus, the forward kinematics is given by combination of rotations about the $\theta$ and $\phi$ axes such as represented by matrix multiplication. Inverse kinematics is the process of obtaining the required angular configuration that produces a desired normal to the mirrored surface.

The forward kinematics of a generalized version of heliostat 130 may be modeled by a set of parameters, $\rho_1$, $\rho_2$, ... $\rho_N$. The parameters may include rigid body translational and rotational parameters of the heliostat's base frame relative to the frame used to survey the positions of other components of the power plant. Additionally, the parameters may include parameters internal to the heliostat of significant manufacturing tolerance such as axis perpendicularity, translational offsets, step-to-orientation non-linearities, mirror mounting angles, etc.

To accurately and rapidly estimate the parameters $\rho_1$, $\rho_2$, ... $\rho_N$, a system according to an embodiment of the present invention utilizes a configuration of cameras directed toward a field of heliostats. Basic operation of a heliostat calibration and tracking control system according to exemplary embodiments includes four phases: sample acquisition, parameter estimation, open-loop tracking, and parameter refresh. During the fourth phase, a small set of heliostats undergoes the first, second, and third phases to refresh their estimated parameters to account for time variability of parameters, for example, following a ground shift or other effects. In the sample acquisition phase, multiple heliostats search for configurations at which sunlight reflections are positively detected by processing of images produced by the cameras. Information available at the time of a detected reflection, called a pointing sample, is recorded. Pointing samples acquired for a particular heliostat are used in the parameter estimation phase to determine a set of heliostat parameters that best fits the pointing samples. The open-loop tracking phase includes performing inverse kinematics using the estimated parameters along with knowledge of the current sun position and target (receiver) location.

Figure 2:
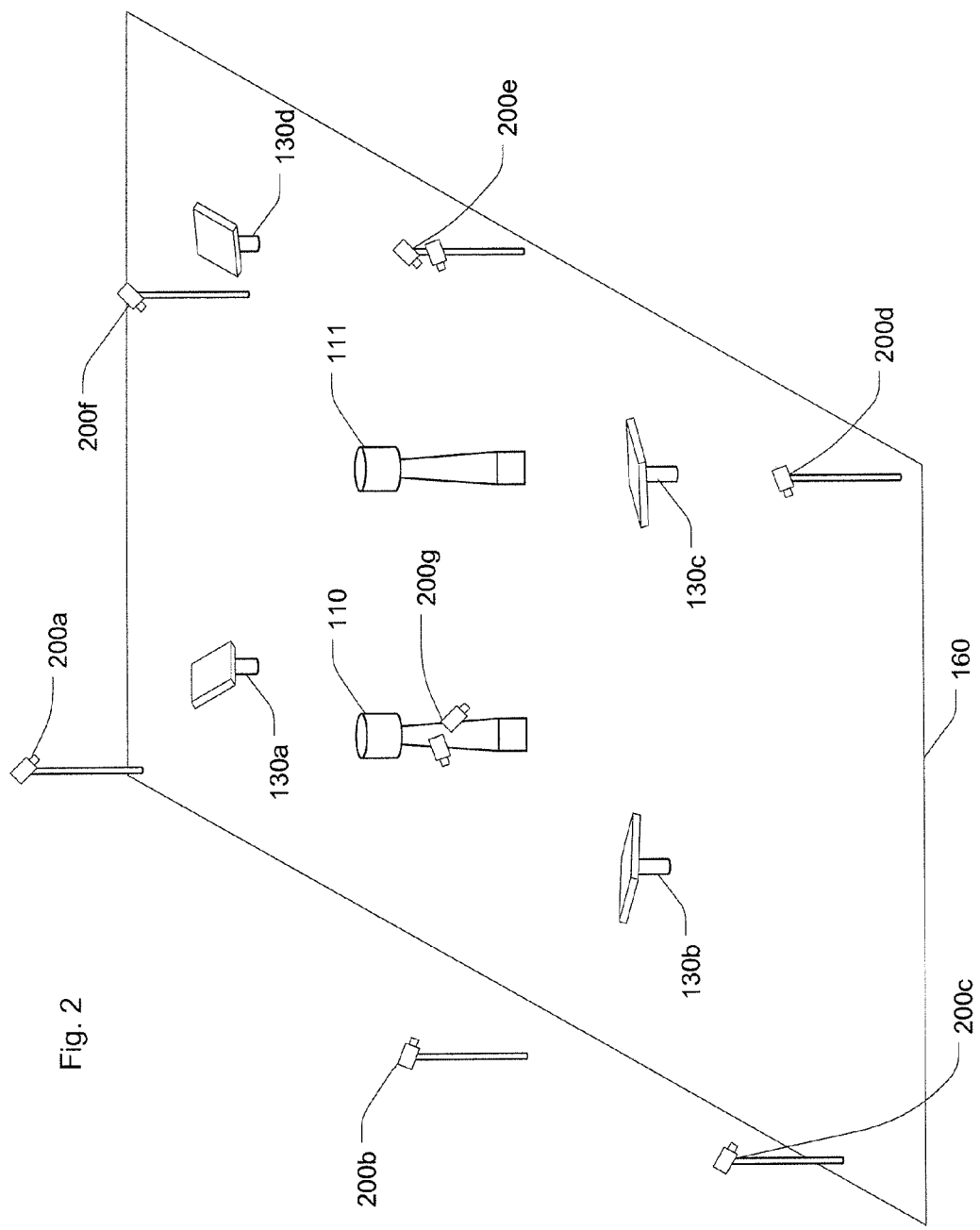
FIG. 2 is a perspective view of a central-receiver power plant according to aspects of the present invention.

FIG. 2 shows a perspective view of a solar power plant according to aspects of the present invention. The power plant is spread over an area of land 160. In the embodiment of FIG. 2, the area of land 160 is a rectangle. In other embodiments, the area of land 160 may be another shape, for example, a circle, an ellipse, a hexagon, an octagon, or even disjoint areas. The power plant includes two receivers 110, 111 near a central area of the land 160. In other embodiments, the number of receivers may be fewer or greater. The power plant also includes heliostats 130a-d distributed across the land 160 to form a heliostat field. FIG. 2 shows four heliostats for illustration purposes; however, an embodiment of the invention will generally have many more heliostats, for example, one hundred to hundreds of thousands.

The power plant also includes cameras 200a-g directed toward regions of the heliostat field. The cameras 200a-g produce images that are used by image processing to detect reflections from the heliostats. The cameras 200a-f are typically mounted on towers. To provide sufficient visibility of the heliostats to be imaged, the height of a tower will generally be shorter or similar to the height of the receiver 110. Some of the cameras, for example, cameras 200a, 200e share the same supporting tower. Cameras 200a, 200c, 200d, 200a are located near the perimeter of the power plant. Camera 200b is located outside the perimeter of the power plant. Camera 200f is located within the heliostat field. Cameras 200g are mounted on a tower that also supports the receiver 110. In some embodiments, the cameras are separated by a distance similar to the heights of the supporting towers. In other embodiments, the cameras may be located in differing manners. In yet other embodiments, cameras may be mounted on wires, tethered balloons, telescoping towers, or movable tower structures.

To reflect sunlight to the receiver, the system uses geometric information about the solar power plant. As previously described, the desired orientation of a heliostat's mirrored surface may be determined by inverse-kinematics based on the direction to the sun and the direction from the center of the mirrored surface to the receiver, and a set of parameters $\rho_1$, $\rho_2, \ldots \rho_N$. The current direction to the sun may be obtained by known methods when the current time and the location on the earth are known. Prior to parameter estimation, the set of heliostat parameters is known only nominally, therefore the desired orientation can only be computed nominally.

The location of each of the cameras 200a-g and receivers 110, 111 is known in a global coordinate system, for example, a terrestrial or celestial coordinate system. The locations may be obtained from standard surveying techniques, for example, by using a Total Station or GPS equipment. An optimization procedure using the heliostat configurations that reflect sunlight to the cameras, the location of the cameras, and the sun's direction when the reflections were taken will provide an estimate of the geometric parameters of the heliostat.

Figure 3:
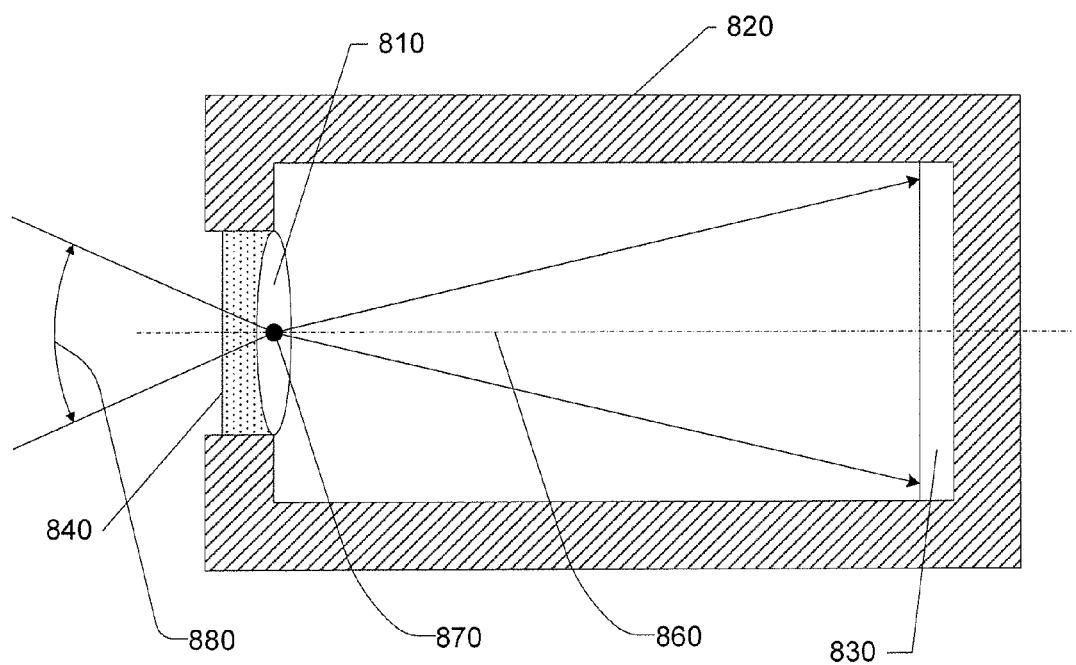
FIG. 3 is a side-view schematic diagram of a camera according to aspects of the present invention.

FIG. 3 shows a schematic diagram of a camera according to an exemplary embodiment for use with a solar power plant such as the one shown in FIG. 2. The camera includes an image sensor plane 830. The sensor output is generally available as an array of pixels via an analog or digital interface. Pixels may be available in grayscale or color. Additionally, the images may be thresholded to produce a binary image. Image processing algorithms are used to detect heliostat reflections as features in the array of pixels. The image sensor may be a CMOS type imager, a CCD type imager, or other types of imagers. Additionally, the camera may be a networked, wireless, or single wired connection camera. The camera may accept control commands such as setting frame rate, gain, and exposure parameters for its sensor.

The camera also includes an aperture 810 that admits light into the camera. In some embodiments, the aperture 810 is a single lens, as shown in FIG. 3. In other embodiments, the aperture 810 includes a number of lens elements of shapes that combine to give a desired light transfer. In yet other embodiments, the aperture 810 is a pinhole. The camera geometry will determine, in part, its field of view 880 and the range of heliostats that can be imaged by the camera concurrently. The camera has a central optical axis 860. Light rays entering the camera pass through a center point 870 in the aperture 810 that is on the optical axis 860. The center point 870 is the specific point defined to be the surveyed location of the camera.

The camera also includes a filter 840 outside the aperture 810. Light entering the camera passes through the filter 840 and then the aperture 810 before reaching the image plane 830. The filter 840 is often a neutral density filter, for example, an ND4 filter. The light passing characteristics of the filter 840 and the aperture 810 combine with the light conversion characteristics of the image plane 830 to establish combined imaging characteristics of the camera. Since the camera may concurrently receive direct reflections of sunlight from multiple heliostats, the combined imaging characteristics of the camera are able to image multiple sun-reflecting heliostats as disjoint compact pixel regions, or blobs without aberrations such as bleeding or saturation, provided said the sun-reflecting heliostats lie sufficiently far from each other.

The camera according to an exemplary embodiment also includes a heat shield 820 intended to reject most heat incident on the camera. If not substantially rejected, heat will increase the temperature of the camera beyond its recommended operating conditions. Accordingly, the heat shield 820 serves to reduce the temperature of the camera. In some embodiments, the heat shield 820 is a highly reflective material. In another embodiment, an air or water cooling subsystem may be included as to take heat away from the camera. Temperature rise will increase as the number of heliostats reflecting sunlight on the camera increases. In some embodiments, this may limit the number heliostats that concurrently reflect sunlight on the camera, and this limit may be known a priori, for example, no more than one hundred heliostats may reflect sunlight into a camera simultaneously. Additionally, the camera exterior may have a narrow cross section to reduce the intercepted incident light.

Figure 4:
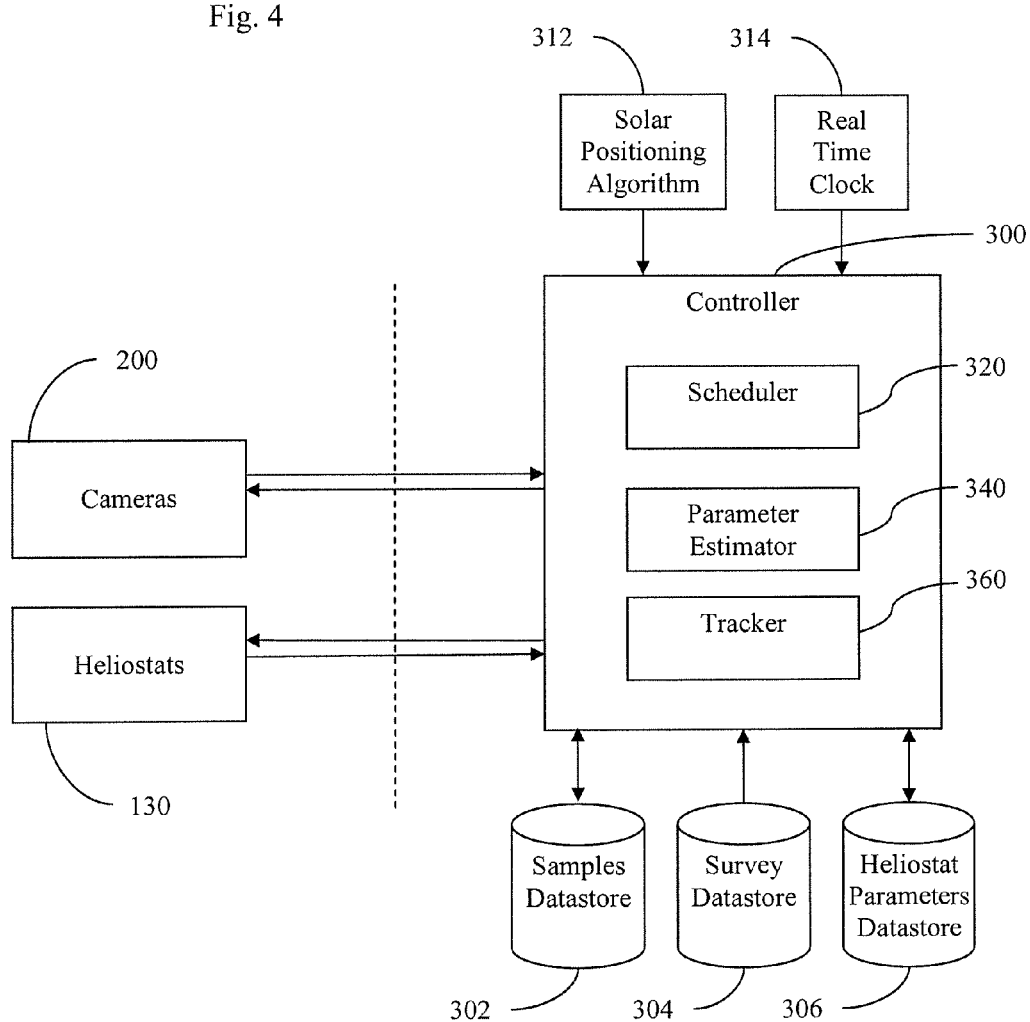
FIG. 4 is a dataflow diagram according to aspects of the present invention.

FIG. 4 is a diagram of an embodiment of a system and method for estimating and using heliostat parameters in the power plant of FIG. 2. The system includes a controller 300 that communicates with cameras 200 and heliostats 130. Communication by the controller 300 with the cameras 200 may include control interfaces to set gain, exposure, and frame acquisition parameters and request an individual frame or a stream of frames. Communication by the controller 300 with the heliostats 130 may include reading sensors, such as limit switches, encoders, and issuing motion and testing/diagnostic commands. The embodiment of FIG. 4 shows a single controller. Other embodiments may have multiple controllers with their functions allocated by heliostats, cameras, or a combination of heliostats and cameras.

The system includes three datastores. The first datastore is a samples datastore 302 of pointing samples acquired using the cameras 200. The second datastore is a survey datastore 304 of surveyed locations of the cameras 200, of the heliostats 130, and of the receivers. The locations of the cameras and receivers are surveyed accurately; however, due to the large number of heliostats, the survey datastore 304 stores only nominal heliostat locations and orientations. The nominal heliostat locations and orientations may be obtained from blueprints of installation plans, but, due to terrain and installation variations, the nominal heliostat locations and orientations will be known at a tolerance level that is generally insufficient for accurate suntracking. The third datastore is a heliostat parameter datastore 306 containing estimated parameters for the heliostats. The controller 300 accesses the datastores.

The samples datastore 302, survey datastore 304, and the heliostat parameters datastore 306 may be implemented as memory or disk storage, as one or multiple flat files, or preferably, by standard database technology, with data resident on permanent storage such as a hard disk.

The system includes a real time clock 314 from which the controller 300 obtains a reading of the current time. The system includes a solar positioning algorithm 312 that provides the current orientation of the sun (for example, in azimuth and elevation with respect to the celestial coordinate system) from the current time, latitude, and longitude. The controller 300 accesses the solar positioning algorithm 312 to obtain directions to the sun from the location on the earth obtained from the survey datastore 304 and the current time obtained from the real time clock 314. The solar positioning algorithm 312 may be an algorithm as described in "Solar Position Algorithms for Solar Radiation Applications," Ibrahim Reda and Afshin Andreas, National Renewable Energy laboratory (NREL), 2008, the contents of which are incorporated herein by reference.

The controller 300 performs a method with three parts: scheduler 320, parameter estimator 340, and tracker 360. The scheduler process 320 includes acquiring pointing samples by directing the heliostats 130 to orientations that reflect sunlight for detection by the cameras 200. Acquisition of pointing samples may take place over several days, and the scheduler process 320 includes scheduling when a given one of the cameras 200 is used to acquire a pointing sample for a given one of the heliostats 130. The parameter estimator process 340 estimates parameters of the heliostats using the acquired pointing samples. The tracker process 360 controls the heliostats to track the sun using the estimated parameters. Heliostats not currently under scheduling may reflect the sun toward a receiver. The scheduler process 320, the parameter estimator process 340, and tracker process 360 may be implemented, for example, as a set of concurrent threads running on a conventional operating system. The system performs tracking open-loop as feedback of a heliostat's reflection into the receiver aperture is generally not measurable due to the high temperatures present at and near the receiver aperture. However, heliostat parameter estimation by the parameter estimator process 340 using the acquired pointing samples acquired by the scheduler process 320 allows accurate tracking without closed-loop control.

Figure 5:
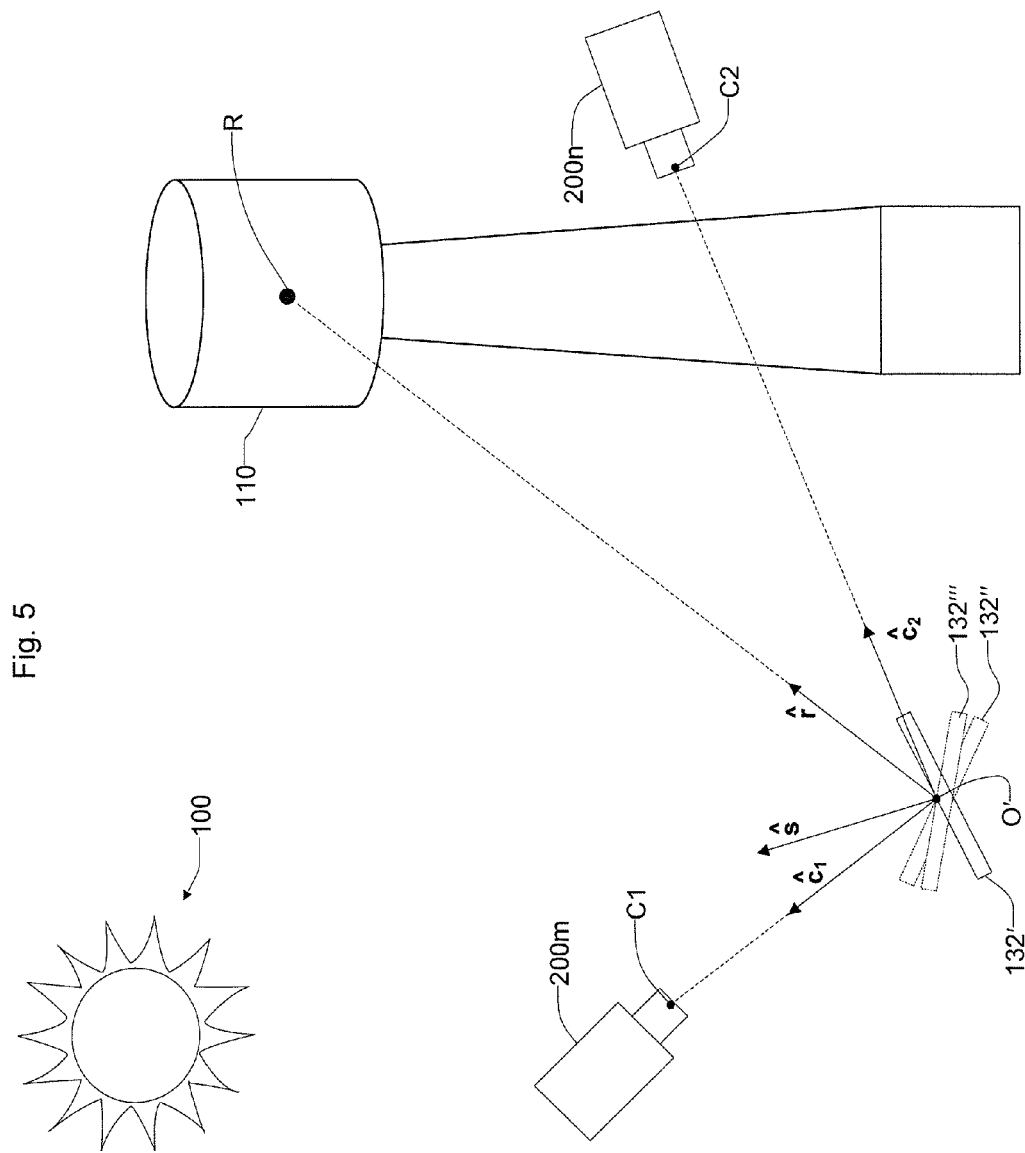
FIG. 5 is a diagram of sunlight reflections according to aspects of the present invention.

FIG. 5 is a diagram of sunlight reflections in a system of FIG. 4. For convenience of description, the sunlight reflections are depicted in two dimensions rather than the three dimensions present in a real-world solar power plant. Those skilled in the art would realize that it would be straightforward to extend this two-dimensional illustration to a three-dimensional case. Light from the sun 100 is reflected by a mirrored surface 132', 132", 132''' of a heliostat. Three orientations of the mirrored surface are shown for purpose of illustration, but it should be understood that an actual mirrored surface would have only one orientation at any given time. Sunlight is reflected to a first camera 200m, a second camera 200n, or the receiver 110 when the mirror surface is oriented at position 132', position 132", or position 132''', respectively. The mirrored surface 132', 132", 132''' in the two-dimensional representation of FIG. 5 is a line segment and is here represented by a single angle of rotation. The mirrored surface 132', 132", 132''' is characterized, in this example, by three independent parameters: an x position, a y position, and an offset angle. As discussed above regarding FIG. 1, by knowing the position of the receiver 110, the direction to the sun, and the geometric parameters of the heliostat, the mirrored surface can be oriented to track the sun as it moves across the sky and reflect sunlight to the receiver. The locations of the receiver 110 and the cameras 200m, 200n may be accurately determined by surveying. More specifically, the location of the central optical apertures C1, C2 for cameras 200m, 200n, respectively, and the target point R on the receiver 110 are accurately surveyed. The direction to the sun may be accurately established by a solar positioning algorithm. Measured configurations of the mirrored surface 132', 132", 132''' that reflect sunlight to a camera provide samples that may be used to determine the parameters of the heliostat.

A set of samples to use in determining the parameters of the heliostat may be obtained as follows. Orient the mirrored surface to orientation 132' to reflect the ray incident at its center through the aperture of the first camera 200m and store the configuration at which the reflection was detected. The heliostat configuration is stored, for example, in the samples datastore 302 of FIG. 4, along with a heliostat identifier, a camera identifier, and the sun direction to form one pointing sample. Then orient the mirrored surface to orientation 132" to reflect sunlight to the second camera 200n and store the corresponding pointing sample. Wait until the sun has sufficiently moved across the sky, and then orient the mirrored surface to new orientation to reflect sunlight to the first camera 200m and record the corresponding pointing sample.

The number of heliostat parameters to be estimated establishes a minimum number of pointing samples required. However, there generally will be uncertainty associated with each sample. Uncertainty may be caused by noise in reflection detection, surveying errors, encoder or step-count errors, limit switch non-repeatability, etc. Because uncertainty in the samples causes uncertainty in the heliostat parameters, the heliostat parameters can only be estimated. It will generally be desirable to acquire additional samples to reduce uncertainty in the estimated parameters, that is, to overconstrain the estimation process. Additional samples may be acquired using additional cameras, additional sun directions, or additional cameras combined with additional sun directions. The effect of error in a sample on the error of an estimated parameter depends on the geometry of cameras and sun positions, especially on their angular excursions vis-à-vis a heliostat, but is generally reduced as more samples are acquired. Thus, the geometry of the system and expected sun motion may be used to determine if a set of samples is sufficient for the estimation process.

A more complex example of heliostat parameterization will now be described. The model includes nine parameters, three of which model manufacturing uncertainties, and six of which model installation uncertainties. The latter consist of the six rigid body parameters $(x,y,z,\alpha,\beta,\gamma)$. A heliostat origin $H=(x,y,z)$ for a pan-tilt heliostat is defined at the intersection of the two rotation axes. A three-axis reference frame attached to H is rotated with respect to a global reference frame $R_0$ by three XYZ Euler angles $(\alpha,\beta,\gamma)$. Three additional parameters are added to account for tolerances in pan and tilt zero positions, mirror mounting offsets, and non-perpendicularity of the axes. As for the manufacturing tolerances, the parameter $\gamma$ is the last of the XYZ Euler angles and a rotation about z, thus it absorbs the pan's zero position. Mirror mounting offsets are modeled by XY Euler angles $(\eta,\zeta)$, of which, $\eta$ can also define the tilt zero position. An angle $\omega$ models the non-perpendicularity between the pan and tilt axes of rotation. The nine-parameter forward kinematic chain which maps the parameters to a mirror normal is shown next, with $R_x$, $R_y$, and $R_z$ representing the standard rotation matrices about the x-axis, y-axis, and z-axis, respectively, and $(\theta,\phi)$ is the current pan-tilt configuration:

$$\hat{n}=R_x(\alpha)\cdot R_y(\beta)\cdot R_z(\gamma)\cdot R_z(\theta)\cdot R_y(\omega)\cdot R_x(\phi)\cdot R_x(\eta)\cdot R_y(\zeta)\cdot \hat{z} \quad (1)$$

The position translation parameters $(x,y,z)$ are not a part of equation (1), because they do not affect the orientation of the normal. However, the position translation parameters $(x,y,z)$ are included in the bisection constraint. The normal vector (left-hand side) must equal the bisector (right-hand side) of the sun direction ŝ and the unit vector from the camera aperture position C from H=(x,y,z):

$$R_x(\alpha) \cdot R_y(\beta) \cdot R_z(\gamma + \underline{\theta}) \cdot R_y(\omega) \cdot R_x(\eta + \underline{\varphi}) \cdot R_y(\zeta) \cdot \hat{z} = \frac{\hat{s} + \frac{C-H}{\|\cdot\|}}{\|\cdot\|} \quad (2)$$

In equation (2), (γ,θ) and (η,φ) have been combined additively to show that they are consecutive rotations about the same axis. The quantities known when a pointing sample is available, namely, (ŝ, C, θ, φ) are shown underlined.

FIG. 6 illustrates additional aspects of sample acquisition in the system of FIG. 4. FIG. 6 shows mirrored surfaces 132a, 132b, 132c of three heliostats. Light from the sun 100 is reflected to a first camera 200m or a second camera 200n or elsewhere depending on the orientation of the mirrored surfaces 132a, 132b, 132c. The first mirrored surface 132a is oriented to reflect sunlight to the first camera 200m. The second mirrored surface 132b is oriented to reflect sunlight to the second camera 200n. The third mirrored surface 132c is oriented to reflect sunlight to the first camera 200m. The second mirrored surface 132b is located near the first mirrored surface 132a. The third mirrored surface 132c is located distant from the first mirrored surface 132a.

The three reflections of sunlight, from the first mirrored surface 132a to the first camera 200m, from the second mirrored surface 132b to the second camera 200n, and from the third mirrored surface 132c to the first camera 200m, occur concurrently. The first mirrored surface 132a and the third mirrored surface 132c may be scheduled to reflect sunlight to the first camera 200m concurrently because of sufficient physical separation (as determined by their expected projected locations in the camera imaging plane) of the first mirrored surface 132a and the second mirrored surface 132b. The physical separation of the first mirrored surface 132a and the third mirrored surface 132c is sufficient for the first camera 200m to image each of the reflections disjointly in the camera plane. In contrast, the close positions of the first mirrored surface 132a and the second mirrored surface 132b would be imaged too closely at the image plane of camera 200m so as to cause confusion as to whether the first mirrored surface 132a, the second mirrored surface 132b, or both were being detected. However, the second mirrored surface 132n may reflect sunlight to the second camera 200n concurrent with reflections from the first mirrored surface 132a and the third mirrored surface 132c to the first camera 200m.

The geometry of the reflections from the first mirrored surface 132a is illustrated in FIG. 6 with unit vectors ĉ$_1$ and ŝ$_1$. Vector ŝ$_1$ represents the direction to the center of the sun 100. Vector ĉ$_1$ represents the direction from a center point Oa of the first mirrored surface 132a to the aperture C1 of the first camera 200m. The first mirrored surface 132a reflects sunlight to the aperture C1 of the first camera 200m when the orientation of the first mirrored surface 132a has a normal vector that bisects the angle between unit vectors ĉ$_1$ and ŝ$_1$.

The geometry of the reflections from the second mirrored surface 132b is illustrated in FIG. 6 with unit vectors ĉ$_2$ and ŝ$_2$. Vector ŝ$_2$ represents the direction to the center of the sun 100. Vector ŝ$_2$ is essentially parallel to vector ŝ$_1$ because the distance to the sun is much greater than the distance between the first mirrored surface 132a and the second mirrored surface 132b. Vector ĉ$_2$ represents the direction from a center point Ob of the second mirrored surface 132b to the aperture C2 of the second camera 200n. The second mirrored surface 132b reflects sunlight to the aperture C2 of the second camera 200n when the orientation of the second mirrored surface 132b has a normal vector that bisects the angle between unit vectors ĉ$_2$ and ŝ$_2$.

The geometry of the reflections from the third mirrored surface 132c is illustrated in FIG. 6 with unit vectors ĉ$_3$ and ŝ$_3$. Vector ŝ$_3$ represents the direction to the center of the sun 100. Vector ŝ$_3$ is essentially parallel to vectors ŝ$_1$ and ŝ$_2$ because the distance to the sun is much greater than the distance between the mirrored surfaces 132a, 132b, 132c. Vector ĉ$_3$ represents the direction from a center point Oc of the third mirrored surface 132c to the aperture C1 of the first camera 200m. The third mirrored surface 132c reflects sunlight to the aperture C1 of the first camera 200m when the orientation of the third mirrored surface 132c has a normal vector that bisects the angle between unit vectors ĉ$_3$ and ŝ$_3$.

FIGS. 7A and 7B illustrate images of a heliostat field from the viewpoint of a camera. FIG. 7A shows, in simplified form, a heliostat array enclosed within a rectangular boundary 500. For convenience of description, only six heliostats are shown in FIG. 7A, but an embodiment of the invention will generally have a large number of heliostats, as high as hundreds of thousands. The array of heliostats includes a first heliostat H100, a second heliostat H200, a third heliostat H300, a fourth heliostat H400, a fifth heliostat H500, and a sixth heliostat H600. The first through fifth heliostats H100, H200, H300, H400, H500 are spatially separated. The sixth heliostat H600 is near the first heliostat H100. A square forbidden zone is defined around the expected location for the center of each heliostat in the image plane. First through sixth forbidden zones F100, F200, F300, F400, F500, F600 are defined around the expected locations for the center of the first through sixth heliostats H100, H200, H300, H400, H500, H600, respectively, in the image plane.

The forbidden zones F100, F200, F300, F400, F500, F600 are used by a scheduler process in choosing which heliostats may concurrently reflect sunlight to a camera. The forbidden zones may be further explained with reference to FIG. 7B. FIG. 7B shows a camera image 510 corresponding to the heliostat array 500 of FIG. 7A. The image 510 is a negative image, that is, bright light areas are dark and vice versa. The image 510 illustrates the situation where the first through sixth heliostats H100, H200, H300, H400, H500, H600 are oriented to reflect sunlight to the camera and other heliostats in the heliostat array 500 are not reflecting sunlight to the camera. Under appropriate filtering and exposure settings, sunlight reflected from one of the heliostats appears in the camera image 510 as a non-saturating, compact, contiguous set of pixels or blob. The shape of the blob varies with characteristics of the camera and mirror, but will generally correspond to an oval produced by the solid angle of the sun. A first blob B100 corresponds to a reflection from the first heliostat H100; a second blob B200 corresponds to a reflection from the second heliostat H200; a third blob B300 corresponds to a reflection from the third heliostat H300; a fourth blob B400 corresponds to a reflection from the fourth heliostat H400; a fifth blob B500 corresponds to a reflection from the fifth heliostat H500; a sixth blob B600 corresponds to a reflection from the sixth heliostat H600.

Each of the blobs B100, B200, B300, B400, B500, B600 is surrounded by a corresponding one of the forbidden zones F100, F200, F300, F400, F500, F600. The forbidden zones F100, F200, F300, F400, F500, F600 are shown superimposed on the image to illustrate which heliostats are allowed to reflect to the camera concurrently. The camera image 510 is analyzed by image processing to determine a set of configurations of the corresponding heliostat that reflect sunlight to the camera. The analysis may include estimating the intensity of the corresponding blob or detecting its presence. The image may be thresholded before detecting the presence of blobs. To reliably estimate the intensity of a blob or even detect its presence, blobs formed by concurrent reflections to the camera should be distinct.

By way of example, consider the first blob B100 corresponding to the reflection from the first heliostat H100 and the sixth blob B600 corresponding to the reflection from the sixth heliostat H600. Since the first heliostat H100 and the sixth heliostat H600 are close together, their corresponding blobs B100, B600 are close together in the camera image 510. More specifically, the sixth blob B600 corresponding to the sixth heliostat H600 falls within the first forbidden zone F100 corresponding to the first heliostat H100. Thus, the sixth heliostat H600 will not be commanded to reflect to the camera while the first heliostat H100 is doing the same.

The forbidden zones F100, F200, F300, F400, F500, F600 are used to avoid having two heliostats concurrently reflecting to the camera, if reflections from the two heliostats are expected to be imaged too closely in the camera image 510 resulting in fused or indistinguishable features. When the first heliostat H100 is attempting to reflect sunlight to the camera, another heliostat whose sunlight reflection would cause a blob intersecting the first forbidden zone F100 will not be allowed to attempt to reflect sunlight to the camera concurrently. The forbidden zone defined around the blob corresponding to a heliostat currently reflecting light into a camera is used, in one embodiment, to prevent other heliostats whose corresponding blobs are expected to intersect with the forbidden zone from being scheduled to search for a reflection into the camera. Alternatively, heliostat exclusion may be based on the center of the corresponding blob falling within the forbidden zone. Other suitable exclusion definitions may also be used, for example, based on two forbidden zones intersecting. As shown in FIG. 7B, the sixth blob B600 extends into the first forbidden zone F100. Thus, the sixth heliostat H600, which would cause the sixth blob B600, will not be allowed to reflect sunlight to the camera at the same time as the first heliostat H100. Although the first blob B100 and the sixth blob B600 are distinct in the example shown in FIG. 7B, in other embodiments the two blobs B100, B600 may fuse together and form a single blob.

The forbidden zones F100, F200, F300, F400, F500, F600 are established from spatial relationships in the camera image 510 stemming from its projective geometry. However, zones of equal size in the camera image may have varying sizes when projected back to the heliostat field. For example, heliostats that are distant from the camera will appear closer together in the camera image than do heliostats that are closer to the camera. Thus, a forbidden zone for a distant heliostat may have more intersecting heliostats than does the forbidden zone for a closer heliostat, and indeed this may lead to more parallelism possible for closer heliostats than further heliostats. A balanced parallelism may be achieved by locating cameras in separate locations within and around the field.

The forbidden zones F100, F200, F300, F400, F500, F600 are square in the embodiment of FIGS. 7A and 7B. Other embodiments may use other shapes, for example, oval, rectangular, or polygonal.

Figure 8:
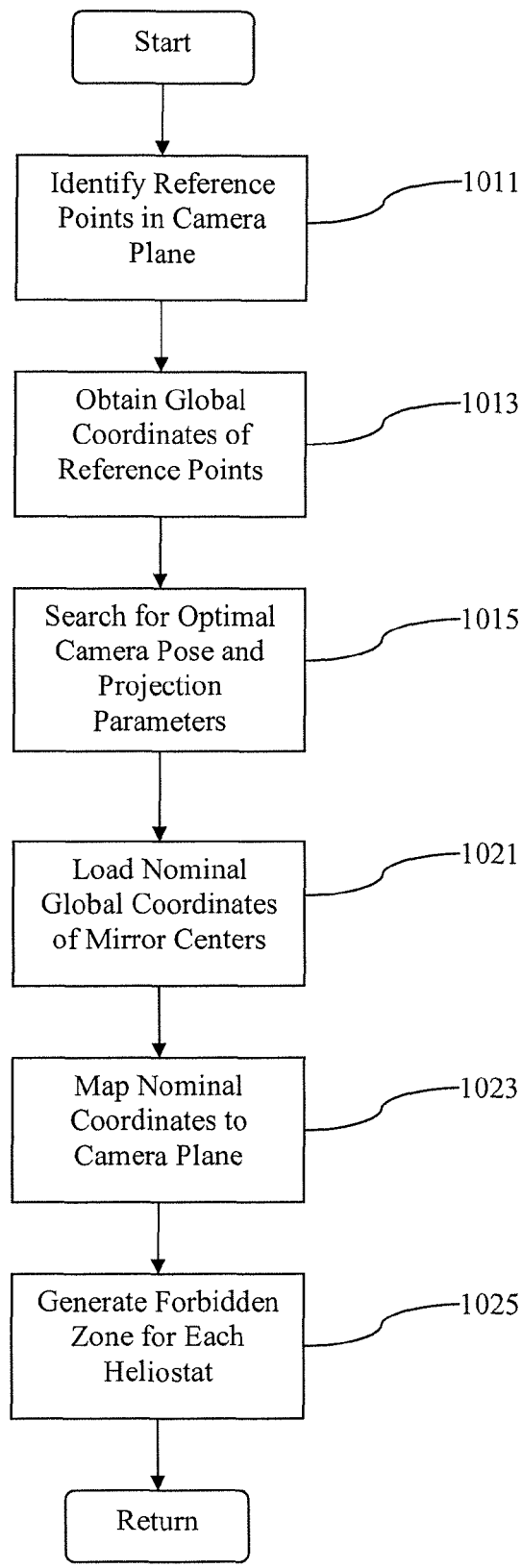
FIG. 8 is a flowchart of a process of initializing forbidden zones according to aspects of the present invention.

FIG. 8 is a flowchart of a process for initialization of forbidden zones according to aspects of the present invention. The process may be implemented prior to deployment of a power plant controller such as the controller 300 shown in the embodiment of FIG. 4. The process is performed for each camera in an embodiment. The process may be performed during surveying of cameras and receivers.

In step 1011, the forbidden zone initialization process begins by identifying reference points in the image plane of a camera. The reference points may be heliostats or ground beacons, such as artificial lights. Identification of the reference points establishes correspondence between where they appear in the image plane and their nominal physical locations. This identification may be performed manually or automatically by a software system. In one embodiment, a human operator observes a camera image, selects visible features in the image, and manually identifies them to known locations. In step 1013, the process obtains the locations of the reference points in a global coordinate system. The locations may be obtained from a datastore of survey information, for example, survey datastore 304 of the embodiment shown in FIG. 4. The process continues from step 1013 to step 1015. In step 1015, the process searches for optimal camera pose and projection parameters that map between the image plane and global coordinates. That is, the process searches for a set of parameters that minimizes the deviation of the projected reference points to the features initially identified in the image plane. This is commonly known as a camera parameter identification process.

After determining camera pose and projection parameters, the process continues to step 1021. In step 1021, the process loads the nominal locations of the centers of the heliostats' mirrored surfaces in the global coordinate system. The coordinates may be obtained from the intended install locations for heliostats, for example, as x,y,z locations from the plant's computer aided design (CAD) model or blueprint. The process then continues to step 1023 where it maps the nominal locations of the centers of the heliostats' mirrored surfaces from the global coordinate system to the camera image plane. The mapping uses the pose and projection parameters found in step 1015. Each location in the camera image plane is an expected location of the center of a blob corresponding to a sunlight reflection from the heliostat to the camera. The process then continues to step 1025. In step 1025, the process calculates a location and shape for a forbidden zone for each heliostat. The forbidden zones are generally centered at the expected locations of each of the heliostats in the image plane. The perimeter of the forbidden zones may have different shapes, for example, an oval or rectangle, in different embodiments. Generally, the perimeter will be spaced from the center of the forbidden by a distance corresponding to the size of a blob caused by a sunlight reflection. The zone may additionally be radially padded to allow for camera orientation misalignment, vibrations of the camera-supporting tower, and other fixed or variable deviations of the expected perspective projection. Additionally, after multiple detections, the shape or radius of the forbidden zones may be adjusted to more tightly skirt the locus of reflections actually detected from a given heliostat. After step 1025, the process returns.

Figure 9:
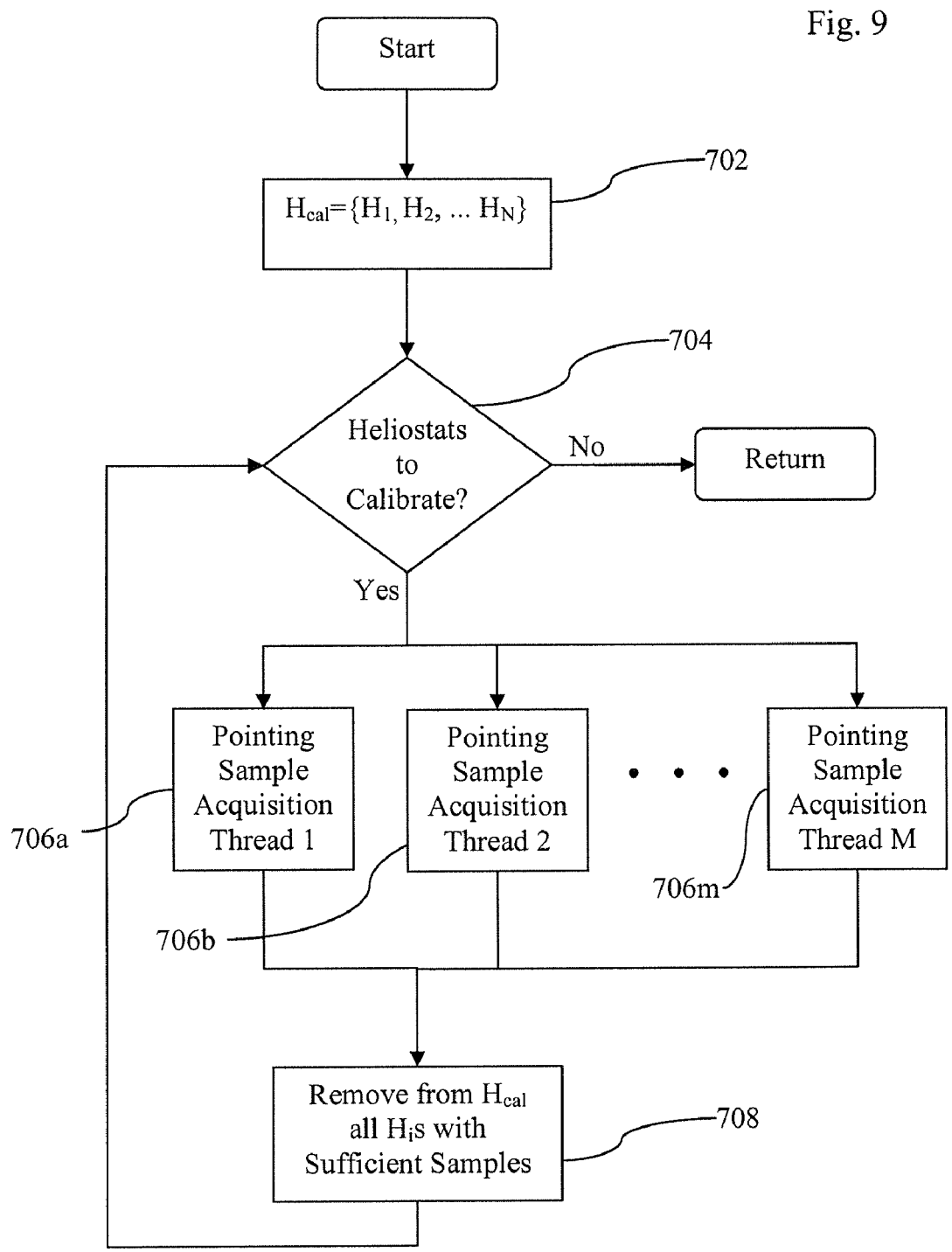
FIG. 9 is a flowchart of a process of scheduling pointing sample acquisition according to aspects of the present invention.
Figure 10:
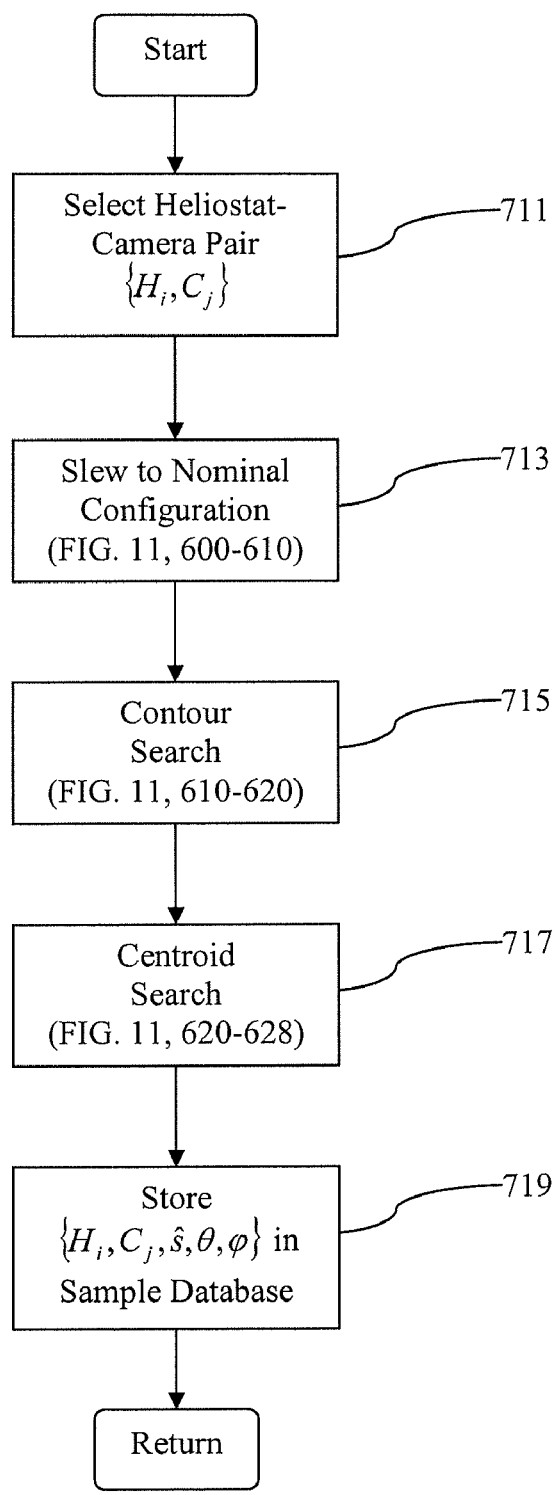
FIG. 10 is a flowchart of a process of pointing sample acquisition according to aspects of the present invention.

FIGS. 9 and 10 are flowcharts of a process for acquiring heliostat pointing samples in an embodiment of the present invention. FIG. 9 is flowchart of a process for scheduling acquisitions of pointing samples. The process may be performed by the controller 300 of FIG. 4 as the scheduler 320. In step 702, the process begins by creating a list $H_{cal}$ of the heliostats for which pointing samples are to be acquired. After installation of a heliostat field, the list $H_{cal}$ will generally include all heliostats properly functioning in the field (those under temporary repair will not be included in this list). In other situations, the list $H_{cal}$ may include a subset of the total heliostats, with the process repeated for different subset of the heliostats. For example, after the entire set of heliostat parameters has been estimated, one percent of the heliostats may be placed into the list $H_{cal}$ in a circular-buffer manner. In this manner, heliostat parameters may be updated to account for changes caused by time-dependent changes in land geometry, aging of the heliostats, wind gust disruptions, etc.

The process then continues to step 704 where it checks if there are any heliostats that need acquisition of pointing samples, that is, the process repeats until the list $H_{cal}$ is empty. If there are no heliostats for pointing sample acquisition, the process returns. If there are heliostats for pointing sample acquisition, the process continues to steps 706a-m. In steps 706a-m, the process initiates concurrent threads to acquire heliostat pointing samples. Concurrent acquisition of heliostat pointing samples by the cameras, and the non-blocking aspect of multi-threading enables a high-level of parallelism and significantly shortens sample acquisition time. In a system where there are M cameras and each camera has a thermal limit of N, the current system will be able to initiate essentially N*M concurrent sample acquisition threads. In one embodiment, N=50, and M=7, so 350 heliostats may be commanded concurrently for sample acquisitions. The process creates a pointing sample acquisition thread for each heliostat in the list $H_{cal}$. In other embodiments, the process may create a pointing sample acquisition thread when less than a maximum number of threads are active. In one embodiment, threads are destroyed when a heliostat completes its sample acquisition. In another embodiment, a thread-pool with N*M working threads is used as a sample acquisition platform, and asynchronous inter-process communication is used to signal the end of sample acquisition for a given heliostat.

When the process completes one of steps 706a-m, it continues to step 708. In step 708, the process checks if it has acquired sufficient pointing samples for the heliostat H, for which a tracking sample acquisition was performed in steps 706a-m. If sufficient samples have been acquired, heliostat $H_i$ is removed from the list $H_{cal}$ of heliostats for pointing sample acquisition. Sufficiency of the pointing samples is whether the samples acquired for heliostat $H_i$ are expected to produce a sufficiently well-conditioned estimation process, that is, whether the samples constrain the solution space with enough orthogonality. The meaning of well-conditioned is further understood after reviewing the subsequent discussion regarding solving for estimated parameters. After step 708, the process then returns to step 704.

FIG. 10 is flowchart of a process for acquiring a pointing sample. In step 711, the process begins by selecting a heliostat and camera pair $(H_i,C_j)$ to use for a sample acquisition. The heliostat $H_i$ is selected from the list $H_{cal}$ of heliostats for pointing sample acquisition. The camera $C_j$ is the camera that heliostat $H_i$ will attempt to reflect sunlight to. In one embodiment, three conditions are used to select the camera $C_j$. The first condition is that the number of heliostats reflecting sunlight to the camera $C_j$ is less than a maximum number. The maximum number is generally determined by a thermal limit. Alternatively, the first condition may be based on the temperature of the camera being less than a maximum allowable temperature, where the temperature of the camera obtained from a temperature sensor located within the camera. The second condition is that sufficient time has passed since the heliostat-camera pair $(H_i,C_j)$ was last used together. The amount of time required is determined by a minimum angular motion of the sun, for example, ten degrees. The third condition is that the blob corresponding to heliostat $H_i$ at camera $C_j$ does not fall within the forbidden zone of another heliostat that is attempting to reflect sunlight to camera $C_j$. If no camera satisfies the conditions, a thread is not scheduled for the heliostat $H_i$. In an alternative embodiment, the thread is scheduled, and it waits until a camera is available. Other embodiments may include additional conditions in the selection of camera $C_j$ such as its location respective to the heliostat. Yet other embodiments may use reliability, blocking by nearby heliostats, centrality with respect to the field of view, or resolution of detection of the heliostat $H_i$ at a particular camera to select camera $C_j$. The process adds heliostat $H_i$ to a list of heliostats currently attempting to reflect sunlight to camera $C_j$.

After selecting a heliostat-camera pair $(H_i,C_j)$, the process continues to step 713. In step 713, the process slews the mirror of the selected heliostat H to a nominal configuration. The nominal configuration may be determined by inverse kinematics using surveyed locations, nominal or incrementally/recently estimated heliostat parameters, and the direction to the sun calculated using a solar positioning algorithm and a real time clock. Step 713 corresponds to the heliostat configurations 600-610 of FIG. 11.

The process continues with step 715 where it performs a contour search. During the contour search step 715, the process slews the mirror of the selected heliostat $H_i$ through a sequence of configurations until a corresponding sunlight reflection is detected by the camera $C_j$. Step 715 corresponds to the heliostat configurations 610-620 of FIG. 11. The heliostat configuration at the end of the contour search corresponds to one of many configurations that produce a detectable reflection. Due to the finite size of the reflecting surface of the heliostat and the sun's disk, there will be a region of heliostat configurations that produce a reflection detectable by the camera. The configuration at the end of the contour search reflects sunlight to the camera $C_j$ but is not a good estimate for the centroid of the region. The centroid of the region is expected, in one embodiment, to correspond to the configuration at which the mirror's center reflects a sunray into the camera aperture, being in such a way particularly useful for heliostat parameter estimation.

Thus, the process then continues to step 717 and performs a centroid search. In step 717, the process slews the heliostat through configurations to find several boundary points of the region in the configuration space that reflects light to the camera. The boundary points may be found by slewing the heliostat's configuration in a first direction until a reflection is no longer detected, and then slewing the configuration in a reverse direction until the reflection is again detected, that is, round trip across the boundary. In some embodiments, hysteresis is added to the round-trips to render them more immune to detection noise. After each configuration corresponding to a boundary point is found, a new direction is chosen and the process repeats to find another boundary point. Step 717 corresponds to the heliostat configurations 620-628 of FIG. 11. The process calculates a centroid of the boundary points to use as the configuration in the acquired sample. The calculated centroid of boundary points corresponds to the heliostat configuration 630 of FIG. 11.

The process then continues to step 719 where it stores a pointing sample $(H_i, C_j, \hat{s}, \theta_{ctr}, \phi_{ctr})$ as a five-element record (a heliostat identifier, a camera identifier, a sun direction, and the two angles of the centroid configuration) in a datastore of pointing samples, for example, the samples datastore 302 of FIG. 4. The heliostat $H_i$ is then configured to reflect sunlight away from camera $C_j$ and is removed from the list of heliostats attempting to reflect sunlight to camera $C_j$.

Figure 11:
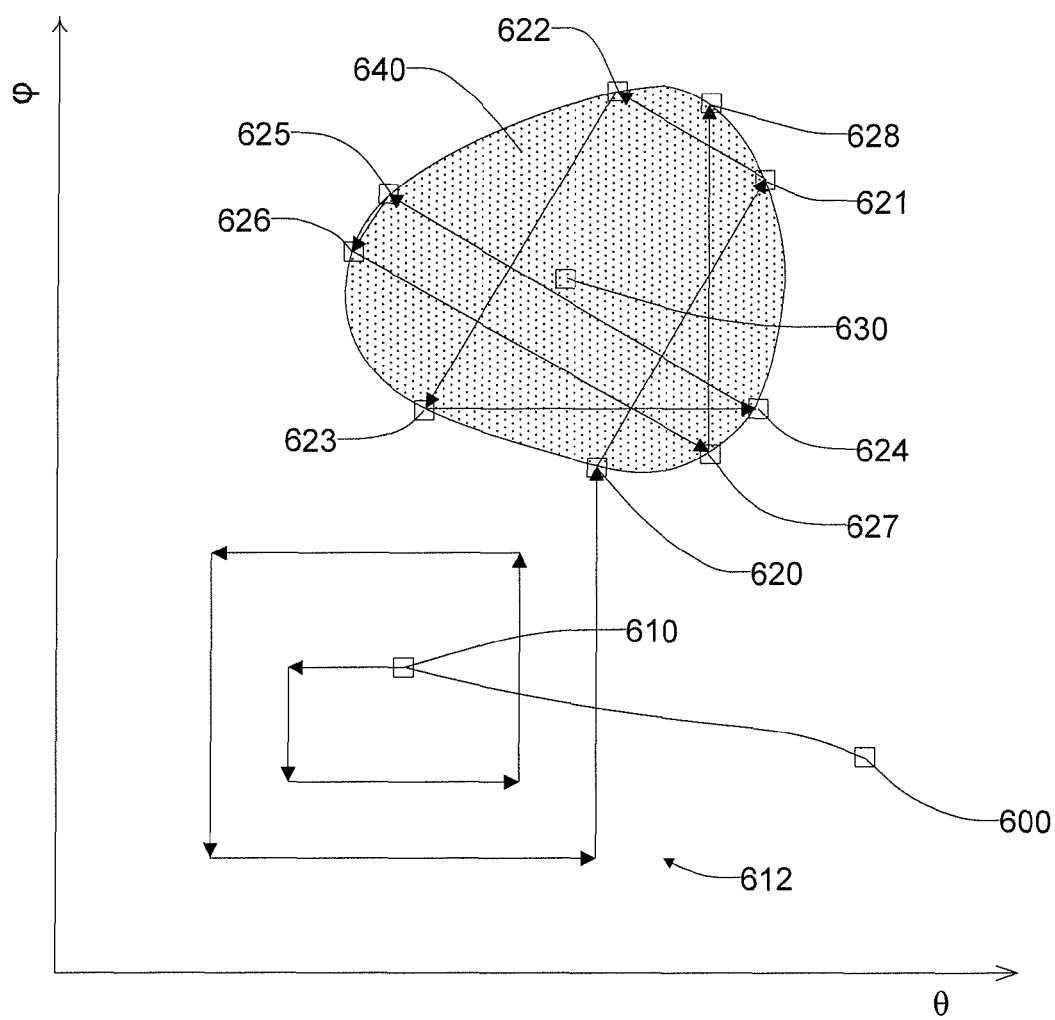
FIG. 11 is a schematic diagram of a heliostat's center reflection search in configuration space according to aspects of the present invention.

FIG. 11 is a graph of an example trajectory of configurations of a heliostat performed while acquiring a pointing sample using a target camera. The heliostat's orientation is controlled in two rotational angles, a pan angle θ and a tilt angle φ. The pan angle θ is graphed along a horizontal axis. The tilt angle φ is graphed along a vertical axis. When a sample acquisition begins, the heliostat is at a starting configuration 600. The starting configuration 600 may be a configuration used in suntracking or near a home position. At the start of an acquisition, the orientation is slewed from the starting configuration 600 to a nominal configuration 610. In some embodiments, the nominal configuration 610 is obtained from inverse kinematics using survey data and sun direction. In other embodiments, the nominal point is interpolated from a previous pointing sample acquisition that used the same heliostat and camera pair.

After setting the heliostat configuration to the nominal configuration 610, a contour search phase begins and moves the configuration along multiple spiral windings 612 about and away from the nominal configuration 610 until the target camera detects a reflection from the heliostat. The multiple spiral windings 612 in FIG. 11 change one of the configuration angles θ, φ at a time. The resulting piecewise straight-line pattern is termed a Manhattan spiral. Other embodiments may use a smooth spiral or windings that vary both rotational angles simultaneously. The illustrated multiple spiral windings 612 move in a counterclockwise direction. Other embodiments may move in a clockwise direction. Alternative embodiments may perform contour searching with an exploratory approach, without using a spiral pattern. For example, the orientation may be set to a sequence of random angles near the nominal point until a reflection is detected.

After contour searching, a centroid search phase begins. Since the reflection from the heliostat is spread over an area that is large compared to the aperture of the camera, many slightly different configurations may result in sunlight reflection that is detected by the camera. The locus of configurations that reflect sunlight onto the camera is an active region 640. The center search locates boundary points of the active region 640 from which the center of the active region 640 may be estimated. In one embodiment, the centroid of the active region 640 is used in specifying the configuration of a pointing sample.

The center search begins at the ending configuration 620 of the contour search. The configuration of the heliostat is then adjusted in a first direction, from configuration 620 towards configuration 621, until sunlight reflected from the heliostat is no longer detected by the camera at configuration 621. Next, the orientation of the heliostat is adjusted in a second direction, from point 621 towards point 622, until the sunlight from the heliostat is no longer detected by the camera at orientation 622. The orientation of the heliostat is adjusted in this manner to determine additional boundary points 623-628. The set of boundary points 620-628 is then processed to estimate a center configuration 630 of the active region 640.

An estimate of the center configuration 630 of the active region 640 is calculated by determining a convex hull of the boundary points 620-628. Then the center of the convex hull is calculated and used as the configuration for a pointing sample. In other embodiments, the average of the boundary points 620-628 is used directly as the configuration for the pointing sample. In still other embodiments, the center may be calculated by weighing each boundary point according to its uncertainty.

The centroid search of FIG. 11 uses nine boundary points, but the present invention is not limited to using nine points or to using a fixed number of boundary points.

In an alternative embodiment, the centroid search is based on finding a configuration that produces the highest intensity of reflection. The intensity of blobs corresponding to sunlight reflections from a heliostat at a set of configurations near the ending point of the contour search is measured. The configurations may be chosen randomly. The centroid is then calculated as the weighted average of the configurations. The weighting is the intensity of the reflection.

Figure 12:
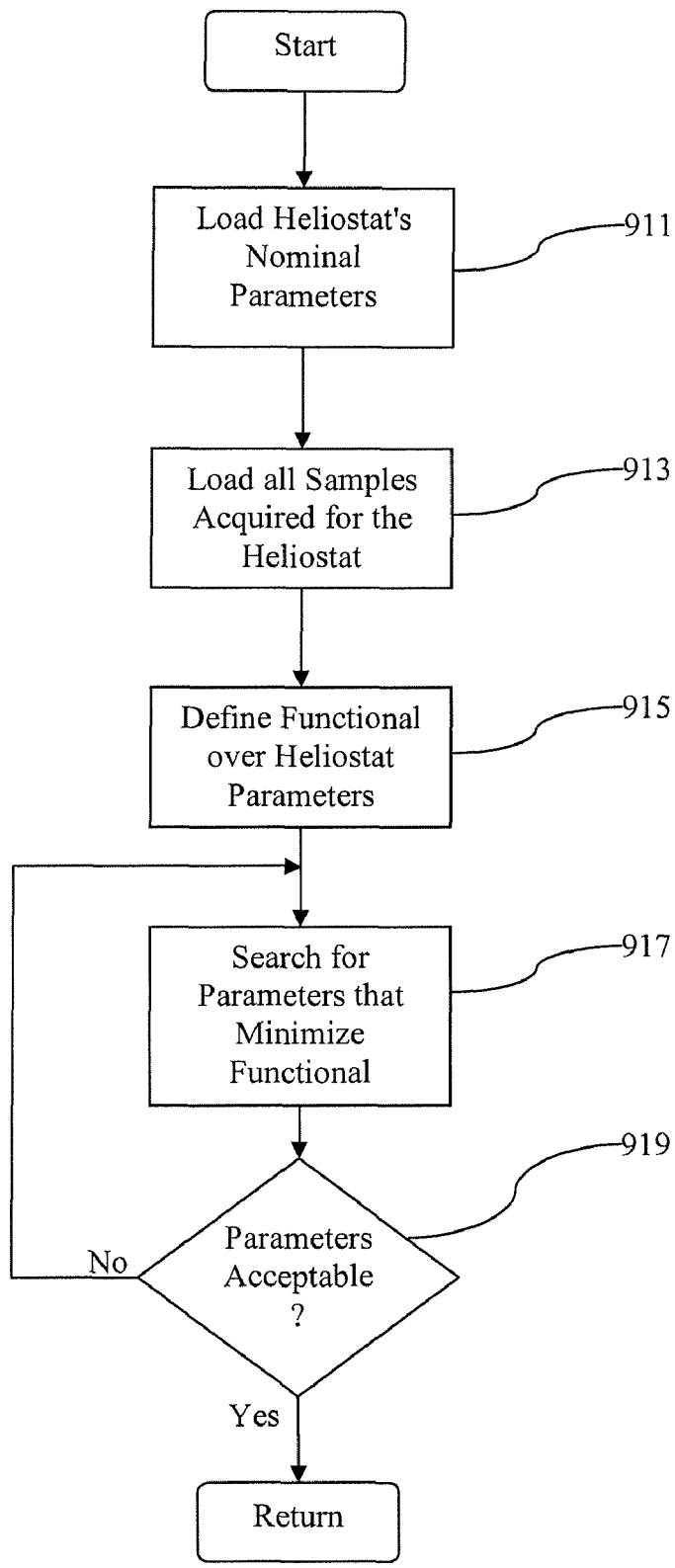
FIG. 12 is a flowchart of a heliostat parameter estimation process according to aspects of the present invention.

FIG. 12 is a flow chart of an estimation process for determining heliostat parameters according to an embodiment of the present invention. The process begins in step 911 where it loads the nominal parameters for a heliostat. The nominal parameters may be from a power plant's CAD model or blueprint. The process then continues to step 913 where is loads all the pointing samples for the heliostat. The pointing samples may be loaded, for example, from a datastore of acquired samples, for example, the samples datastore 302 of the system of FIG. 4. The process then continues to step 915 where it defines a functional over the heliostat parameters. In on embodiment, the functional is the sum of the positive or square residuals of equation (2) evaluated for each sample. Because equation (2) is between two unit vectors, in one embodiment, the residual is the angular deviation between the two unit vectors. After step 915, the process continues to step 917. In step 917, the process searches for parameters that minimize the functional. The minimization generally uses a numerical method, for example, Gauss-Newton or Levenberg-Marquardt. The process then continues to step 919. In step 919, the process checks if the parameters found in step 917 are acceptable. Acceptability may be based on whether the parameters are within expected ranges. The expected ranges may be determined statistically from installation and manufacturing processes. Unacceptable parameters could result from a numerical minimization performed in step 917 converging to an unacceptable local minimum or failing to converge with sufficient accuracy. If the parameters are not acceptable, the process continues back to step 917 to search for another set of parameters. After a few unsuccessful trials, the scheduler may be required to acquire more samples, or the heliostat may be flagged for diagnostics and potential repair. If the parameters are acceptable, the process returns.

Continuing with the nine-parameter heliostat model described above, example calculations for estimating parameters are now described. An acquired sample for a heliostat corresponds to when the heliostat successfully reflects its estimated center ray to a camera. Samples are stored as (H,C, ŝ,θ,φ) with the corresponding heliostat identifier, camera identifier, sun direction, and the centroid configuration angles. Using equation (2), a forward kinematic matrix $FK_i$, corresponding to the ith sample, is:

$$FK_i = R_x(\alpha) \cdot R_y(\beta) \cdot R_z(\gamma+\theta_i) \cdot R_y(\omega) \cdot R_x(\eta+\phi_i) \cdot R_y(\zeta) \quad (3)$$

The unit bisector between vectors to the sun and to the camera are given by:

$$\hat{b}_i = \frac{\hat{s}_i + \frac{C_i - (x, y, z)^T}{\|\cdot\|}}{\|\cdot\|} \quad (4)$$

Equations (3) and (4) allow equation (2) to be rewritten as:

$$FK_i \cdot \hat{z} = \hat{b}_i \quad (5)$$

A collection of N data points (i=1 to N) results in a system of N non-linear equations having M unknowns. In the present example embodiment, M=9, and the unknowns are (x, y, z, α, β, γ, η, ζ, ω). A numerical estimate may be found for the parameters using an error functional defined for each equa tion. The error functional may simply be the square of the residual difference between left-hand and right-hand sides:

$$err_i^2 = (FK_i \cdot \hat{z} - \hat{b}_i)^2 \quad (6)$$

The parameter estimation process can then be performed as a non-linear least-squares problem. That is, the process finds the M-parameter set that minimizes the sum of the squared errors:

$$\min_{x,y,z,\alpha,\beta,\gamma,\eta,\zeta,\omega} \sum_i err_i^2 \quad (7)$$

An alternative embodiment may minimize the sum of $err_i$ (i.e., without squaring the errors). Yet another embodiment may use the least-absolute-deviations method to first identify and remove outliers, followed by a least-squares procedure to estimate the optimum vector.

Both the left-hand and right-hand sides of equation (5) are unit vectors. Since the space of unit vectors is two-dimensional, each pointing sample provides two independent constraints in the 9-dimensional solution space. Therefore, at least $\lceil 9/2 \rceil = 5$ linearly-independent samples are required for a unique solution. Generally, a minimum number of samples A required to estimate the heliostat parameter vector is related to the number of mathematical constraints B imposed by each sample and the size of the parameter vector under estimation C. A is the smallest integer not smaller than the C/B. In one embodiment, the parameter vector contains six rigid body parameters of a heliostat and three internal manufacturing parameters including translational and angular offsets, therefore C=9. Additionally, in one embodiment, each sample has two configuration angles, therefore B=2, and therefore, A is at least 4.

The constraints in equation (5) are further understood after being rewritten as:

$$(FK_i \cdot \hat{x}) \cdot \hat{b}_i = 0$$

$$(FK_i \cdot \hat{y}) \cdot \hat{b}_i = 0 \quad (8)$$

If there are M parameters, each of equations (9) specifies an (M−1)-dimensional constraint surface in the solution space, in the present example embodiment, an 8-dimensional, hypersurface in the solution space. Two constraints are linearly independent (possess orthogonality) if their gradients with respect to all nine variables are non-parallel. For N samples, a 2N×9 matrix J of gradients can be assembled, also known as the Jacobian of the associated non-linear system. In the vicinity of a solution, the Jacobian must be full rank (that is, 9). Because there will be noise in pointing data acquisition, for example, due to errors in sun position and heliostat angles, an overconstrained system (N>5) is used in one embodiment for the purposes of filtering out non-systematic noise. For example, samples from twelve acquisitions may be used.

Gauss-Newton iterations are used in one embodiment to minimize the error functional. From a current estimate of the solution P, a Gauss-Newton step dP toward the solution is found by setting f(P+dP)=0, i.e., the desired dP is the solution to a linear system conditioned by J(P):

$$J(P) \cdot dP = -f(P) \quad (9)$$

In an alternative embodiment, a Levenberg-Marquardt method may be used to solve the non-linear least-squares problem. The Levenberg-Marquardt method has increased stability over the Gauss-Newton method when the iteration seed is far from the solution. Convergence of a Gauss-Newton method is inversely proportional to J's condition number (i.e., the ratio of its largest singular value to its smallest singular value). The Levenberg-Marquardt method has convergence inversely proportional to the square of J's condition number, generally resulting in slightly poorer numerics and execution time, but its higher stability warrants its choice in a preferred embodiment.

Orthogonality of pointing samples is enhanced with (1) sufficient angular distance between sun directions in two samples, and (2) sufficient angular distance, measured from the center of the heliostat's mirrored surface, between the cameras used in acquiring two samples. The first condition may be satisfied by waiting a sufficient amount of time between acquiring two samples with the same heliostat into the same camera. The second condition may be satisfied when cameras reflected into are sufficiently far from each other as viewed from a heliostat. In one embodiment, three samples acquired by each of three distinct cameras (a total of nine samples) may be used to provide sufficient orthogonality. In another embodiment, the method may impose another number, such as twelve samples, acquired by three or more distinct cameras (four samples per camera), in round-robin fashion. In yet another embodiment, the precise order of sample acquisitions, as well as the target cameras, may be based upon a mathematical estimation.

Figure 13:
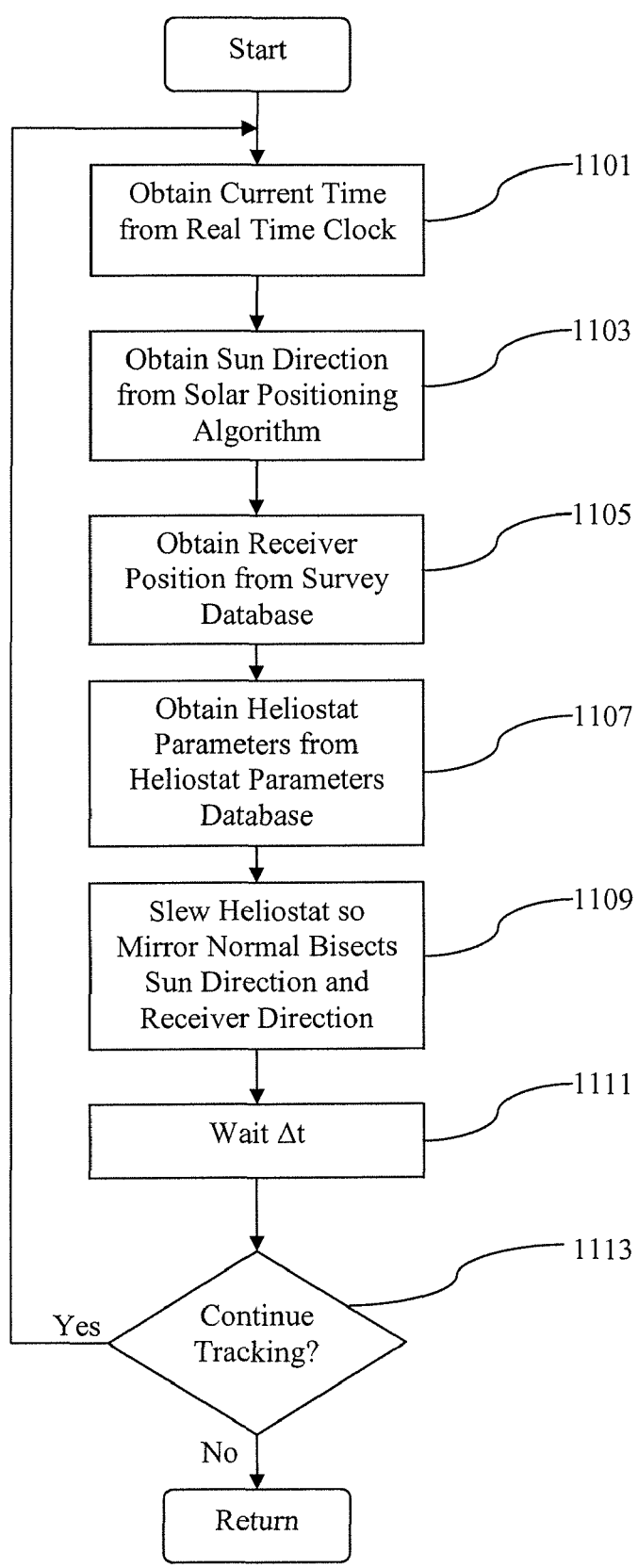
FIG. 13 is a flowchart of a tracking process according to aspects of the present invention.

FIG. 13 is a flowchart of a process for heliostat suntracking in a solar power plant. The process may be implemented by a power plant controller, for example, the controller 300 of FIG. 4. In step 1101, the process begins by obtaining the current time from a real time clock, for example, the real time clock 314 of FIG. 4. Then in step 1103, the process obtains the sun's direction using a solar positioning algorithm, the current location in longitude and latitude, and the current time. The process then continues to step 1105. In step 1105, the process obtains the location of the receiver from a datastore, for example, the survey datastore 304 of FIG. 4. The process then continues to step 1107. In step 1107, the process obtains estimated heliostat parameters from a datastore, for example, the heliostat parameters datastore 306 of FIG. 4.

After obtaining the estimated heliostat parameters in step 1107, the location of the receiver in step 1105, and the direction to the sun in step 1103, the process calculates a bisecting configuration (for example, using inverse kinematics) and continues to step 1109 where it slews the heliostat to a configuration that reflects sunlight to the receiver. The configuration orients the mirrored surface of the heliostat so that a normal to the mirrored surface bisects the sun direction and the receiver direction. In an alternate embodiment, a specific location within the receiver aperture may be chosen as the center of the reflection to, for example, control the flux pattern at one or more receiver surfaces.

The process then continues to step 1111 where it waits for a time Δt. The amount of wait time Δt may be chosen based on balancing power consumption by heliostat motion versus spillage incurred at the receiver aperture by not moving. After step 1111, the process continues to step 1113. In step 1113, the process checks if it should continue suntracking. If yes, the process returns to step 1101. If no, the process returns. This process is performed for each heliostat in a solar power plant. However, some steps may be shared for multiple heliostats, for example, obtaining the receiver position in step 1105. In other embodiments, a set of configurations for use in one daylight period is pre-computed, for example, during a night-time period, and stored for later use in suntracking during the daylight period.

Although the present invention has been described in certain specific embodiments, many additional modifications and variations would be apparent to those skilled in the art. It is therefore to be understood that this invention may be practiced other than as specifically described. Thus, the present embodiments of the invention should be considered in all respects as illustrative and not restrictive and the scope of the invention determined by the claims supported by this application and their equivalents.

What is claimed is:

1. A suntracking system for a solar power plant with a receiver, comprising:
   a heliostat field comprising three or more heliostats;
   a plurality of cameras directed toward the three or more heliostats, wherein the plurality of cameras comprises a first camera and a second camera, each camera configured to capture an image of at least one of the three or more heliostats;
   a calibration controller configured to concurrently:
      acquire one or more orientation angles of a first heliostat for which reflected sunlight from the first heliostat is detected by the first camera;
      acquire one or more orientation angles of a second heliostat for which reflected sunlight from the second heliostat is detected by the first camera; and
      acquire one or more orientation angles of a third heliostat for which reflected sunlight from the third heliostat is detected by the second camera; and
   an estimation controller configured to estimate at least one geometric parameter for each of the three or more heliostats based on the one or more orientation angles and at least one nominal geometric parameter of the respective heliostat,
   wherein the system is configured to determine whether heliostats of the three or more heliostats are permitted to concurrently reflect or excluded from concurrently reflecting sunlight to be detected by a given camera of the first and second cameras based on proximities of the heliostats in an image plane of the given camera.

2. The suntracking system of claim 1, further comprising a tracking controller configured to orient the three or more heliostats to reflect sunlight to the receiver based, in part, on the at least one geometric parameter of the respective heliostat.

3. The suntracking system of claim 1, wherein at least one of the plurality of cameras comprises a heat shield and an optical filter.

4. The suntracking system of claim 1, wherein the receiver is mounted on a tower, and at least one of the plurality of cameras is mounted on said tower.

5. The suntracking system of claim 1, further comprising a plurality of towers supporting at least some of the cameras, a tower of the plurality of towers supporting at least two of the plurality of cameras.

6. The suntracking system of claim 5, wherein the calibration controller is configured to acquire said one or more orientation angles of the heliostats when a blob corresponding to one or more of the respective heliostats is detected in the images from the plurality of cameras.

7. The suntracking system of claim 6, wherein the blobs corresponding to the one or more heliostats are individually resolvable.

8. The suntracking system of claim 1, wherein each of the three or more heliostats comprises a mirrored surface having an orientation adjustable in two degrees of freedom, the mirrored surface selected from the group consisting of substantially planar, substantially concave, and multi-faceted.

9. The suntracking system of claim 8, wherein the calibration controller is configured to determine the respective orientation of each of the three or more heliostats with at least one of step counting or an encoder.

10. The suntracking system of claim 1, wherein the calibration controller is further configured to generate a timestamp for the acquired orientation angles of the first, second, and third heliostats.

11. The suntracking system of claim 1, wherein the estimation controller is configured to estimate the at least one geometric parameter for each of the three or more heliostats by numerically minimizing an error functional based on the one or more acquired orientation angles for the respective heliostat.

12. A method of tracking the sun in a solar power plant comprising a receiver, a heliostat field with three or more heliostats, and a plurality of cameras comprising a first camera and a second camera configured to capture images of the three or more heliostats, the method comprising:
   acquiring one or more orientation angles of a first heliostat of the three or more heliostats for which reflected sunlight from the first heliostat is detected by the first camera;
   acquiring one or more orientation angles of a second heliostat of the three or more heliostats for which reflected sunlight from the second heliostat is detected by the first camera;
   acquiring one or more orientation angles of a third heliostat of the three or more heliostats for which reflected sunlight from the third heliostat is detected by the second camera;
   estimating at least one geometric parameter for each of the three or more heliostats based on the one or more orientation angles and at least one nominal geometric parameter of the respective heliostat; and
   determining whether heliostats of the three or more heliostats are permitted to concurrently reflect, or excluded from concurrently reflecting sunlight to be detected by a given camera of the first and second cameras based on proximities of the heliostats in an image plane of the given camera.

13. The method of claim 12, further comprising orienting the three or more heliostats to reflect sunlight to the receiver based, in part, on the at least one geometric parameter of the respective heliostat.

14. The method of claim 12, wherein the steps of acquiring further comprise:
   setting an orientation of the first heliostat to a starting orientation;
   varying the orientation of the first heliostat about the starting orientation until a reflection is detected by the first camera;
   varying the orientation of the first heliostat within a region which maintains detection of the reflection of the first heliostat by the first camera; and
   estimating a centroid of said region for which a detection of the reflection is maintained.

15. The method of claim 14, wherein the step of varying the orientation of the first heliostat about the starting orientation comprises:
   varying the orientation of the first heliostat in a spiral pattern that spirals outward from the starting orientation; or
   varying the orientation of the first heliostat randomly about the starting orientation.

16. The method of claim 14, wherein the estimating further comprises:

numerically minimizing an error functional based on the one or more acquired orientation angles for the three or more heliostats.

17. The method of claim 14, wherein the step of orienting the three or more heliostats to reflect sunlight to the receiver further comprises concurrently:

acquiring one or more orientation angles of a fourth heliostat for which reflected sunlight from the fourth heliostat is detected by at least one of the plurality of cameras; and estimating at least one geometric parameter for the fourth heliostat.

\* \* \* \* \*